US012724487B2

(12) United States Patent
Hiromi et al.

(10) Patent No.: US 12,724,487 B2
(45) Date of Patent: Sep. 1, 2026

(54) INFORMATION PROCESSING DEVICE, INFORMATION PROCESSING SYSTEM, AND INFORMATION PROCESSING METHOD

(71) Applicant: DENSO TEN Limited, Kobe (JP)

(72) Inventors: Rei Hiromi, Kobe (JP); Shinichi Shiotsu, Kobe (JP); Yoshikuni Miki, Kobe (JP); Akio Arai, Kobe (JP); Yohei Kakee, Kobe (JP)

(73) Assignee: DENSO TEN Limited, Kobe (JP)

( * ) Notice: Subject to any disclaimer, the term of this patent is extended or adjusted under 35 U.S.C. 154(b) by 241 days.

(21) Appl. No.: 18/695,230

(22) PCT Filed: Mar. 4, 2022

(86) PCT No.: PCT/JP2022/009472

§ 371 (c)(1),
(2) Date: Mar. 25, 2024

(87) PCT Pub. No.: WO2023/166721

PCT Pub. Date: Sep. 7, 2023

(65) Prior Publication Data

US 2025/0155979 A1 May 15, 2025

(51) Int. Cl.
*G06F 3/01* (2006.01)
*G06F 3/16* (2006.01)

(52) U.S. Cl.
CPC .............. *G06F 3/016* (2013.01); *G06F 3/011* (2013.01); *G06F 3/16* (2013.01)

(58) Field of Classification Search
CPC ................................................ G06F 3/048–05
See application file for complete search history.

(56) References Cited

U.S. PATENT DOCUMENTS 6,316,934 B1 * 11/2001 Amorai-Moriya ..... G01B 7/004 324/207.17
11,056,127 B2 * 7/2021 Zavesky .................. G10H 1/40
11,363,398 B2 * 6/2022 Chen ....................... H04S 3/008
2011/0190058 A1 * 8/2011 Houston ............... A63F 13/285 463/36
2011/0248837 A1 10/2011 Israr et al.
2014/0085414 A1 * 3/2014 Zhou ...................... A61H 23/02 348/43
2014/0266644 A1 * 9/2014 Heubel .................. H04R 27/00 340/407.1

(Continued)

FOREIGN PATENT DOCUMENTS

JP 2004-081357 A 3/2004
JP 2015-121918 A 7/2015

(Continued)

*Primary Examiner* — Daniel Rodriguez
(74) *Attorney, Agent, or Firm* — Oliff PLC

(57) ABSTRACT

An information processing device according to embodiments controls a vibration device including a plurality of vibrators and configured to apply vibration to a user in response to an input signal. The information processing device identifies a directional component of the object constituting a vibration source relative to the vibration device in input content and controls an amplitude and a delay of each of the vibrators, based on the directional component.

16 Claims, 20 Drawing Sheets

(56) References Cited

U.S. PATENT DOCUMENTS

| | | | | |
|---|---|---|---|---|
| 2015/0356838 | A1* | 12/2015 | Obana | A63F 13/92 340/407.1 |
| 2017/0090578 | A1* | 3/2017 | Keller | G06F 3/011 |
| 2017/0168773 | A1* | 6/2017 | Keller | G06F 3/165 |
| 2017/0172382 | A1* | 6/2017 | Nir | A61B 1/05 |
| 2017/0285753 | A1* | 10/2017 | Rihn | A63F 13/285 |
| 2019/0278369 | A1* | 9/2019 | Ballard | A63F 13/28 |
| 2019/0294249 | A1* | 9/2019 | Martin | G06F 3/0346 |
| 2019/0310712 | A1* | 10/2019 | Araújo | G02B 27/017 |
| 2019/0384404 | A1* | 12/2019 | Raghoebardajal | G06F 3/16 |
| 2021/0132695 | A1* | 5/2021 | Yokoyama | G06F 3/016 |
| 2021/0287690 | A1* | 9/2021 | Zavesky | G10H 1/368 |
| 2022/0137709 | A1* | 5/2022 | Woods | G06F 3/016 463/30 |
| 2022/0198954 | A1* | 6/2022 | Hao | G09B 23/283 |
| 2022/0339534 | A1* | 10/2022 | Kim | G06F 3/016 |
| 2023/0419855 | A1* | 12/2023 | Wallace | G09B 19/00 |
| 2024/0214757 | A1* | 6/2024 | Wang | H04R 1/403 |

FOREIGN PATENT DOCUMENTS

| | | | |
|---|---|---|---|
| JP | 2017-021476 | A | 1/2017 |
| JP | 2021-145373 | A | 9/2021 |
| JP | 2021-158392 | A | 10/2021 |

* cited by examiner

FIG.6

| DETECTION SCENE | CONDITION CATEGORY | TARGET | CONDITION PARAMETER | THRESHOLD | CONDITIONAL EXPRESSION |
|---|---|---|---|---|---|
| SCENE A | POSITIONAL RELATIONSHIP BETWEEN USER AND TARGET | OBJECT 1 | DISTANCE (d) | 10m | d<THRESHOLD |
| SCENE B | POSITIONAL RELATIONSHIP BETWEEN USER AND TARGET | OBJECT 2 | ANGLE (a) | 30° | a<THRESHOLD |
| SCENE C | USER'S ACTION | USER | SPEED (v) | 100km/h | v>THRESHOLD |
| SCENE D | USER'S ACTION | USER | ACCELERATION (q) | 1q | q>THRESHOLD |
| SCENE E | USER'S ACTION | USER | ROTATIONAL SPEED (r) | 10°/s | r>THRESHOLD |
| SCENE F | SPATIAL INFORMATION WHERE USER IS PRESENT | SPACE 1 | INSIDE SPACE | - | In SPACE 1 |
| SCENE G | SPATIAL INFORMATION WHERE USER IS PRESENT | SPACE 1, OBJECT 3 | PRESENCE OF OBJECT, QUANTITY | 10 OBJECTS | (QUANTITY OF OBJECTS in SPACE 1)>THRESHOLD |
| SCENE H | SPATIAL INFORMATION WHERE USER IS PRESENT | CONTENT 1 | START TIME (t1) TO END TIME (t2) | 10 - 30 SECONDS | t1<REPLAY TIME<t2 |
| SCENE W | GENERATION OF SOUND FROM TARGET | OBJECT 4 | DISTANCE (d) AUDIO PATTERN | 20m | d<THRESHOLD AND AUDIO PATTERN SIMILAR TO PATTERN w |
| SCENE X | GENERATION OF SOUND FROM TARGET | OBJECT 5 | DISTANCE (d) AUDIO PATTERN | 20m | d<THRESHOLD AND AUDIO PATTERN SIMILAR TO PATTERN x |
| SCENE Y | GENERATION OF SOUND FROM TARGET | OBJECT 6 | DISTANCE (d) AUDIO PATTERN | 20m | d<THRESHOLD AND AUDIO PATTERN SIMILAR TO PATTERN y |
| SCENE Z | GENERATION OF SOUND FROM TARGET | OBJECT 6 | DISTANCE (d) AUDIO PATTERN | 20m | d<THRESHOLD AND AUDIO PATTERN SIMILAR TO PATTERN z |
| ... | ... | ... | ... | ... | ... |

FIG.7

| DETECTION SCENE | CONDITIONAL EXPRESSION | CONDITION CATEGORY |
|---|---|---|
| SCENE I | AND CONDITION | SCENE A, C |
| SCENE J | AND CONDITION | SCENE C, F |
| SCENE K | AND CONDITION | SCENE A, B, E |
| SCENE L | OR CONDITION | SCENE A, C |
| ... | ... | ... |

FIG.8

| DETECTION SCENE | CONDITIONAL EXPRESSION | CONDITION PARAMETER |
|---|---|---|
| SCENE M | AND CONDITION | SCENE A, C |
| SCENE N | AND CONDITION | SCENE C, F |
| SCENE P | AND CONDITION | SCENE A, B, E |
| SCENE O | OR CONDITION | SCENE A, C |
| ... | ... | ... |

FIG.9

| RULE NUMBER | PRIORITY RULE |
|---|---|
| 1 | PRIORITY TO SCENE DETECTED EARLIER |
| 2 | PRIORITY TO SCENE DETECTED LATER (SWITCH TO LATER SCENE) |
| 3 | PRIORITY TO PARTICULAR PARAMETER WITH GREATER WEIGHT |
| 4 | PRIORITY TO PARAMETER WITH GREATER WEIGHT |
| 5 | PRIORITY TO PARAMETER OF SHORTER SCENE |
| ... | ... |
| 11 | PRIORITY TO GREATER AMPLITUDE IN LOW FREQUENCY BAND |
| 12 | PRIORITY TO SCENE WITH LARGE TEMPORAL VARIATIONS IN SOUND OR VIDEO |
| 13 | PRIORITY TO SCENE WITH TARGET NEAR THE CENTER OF FIELD OF VIEW |
| 14 | PRIORITY TO SCENE X OVER SCENE W |
| ... | ... |

FIG.10

| SCENE NAME | AUDIO ENHANCEMENT PARAMETER | | | | VIBRATION PARAMETER | | |
|---|---|---|---|---|---|---|---|
| | FOR SPEAKER 1 | | FOR SPEAKER 2 | | | | |
| | DELAY | BAND EN-HANCEMENT/ ATTENUATION | DELAY | BAND EN-HANCEMENT/ ATTENUATION | LPF | AMPLITUDE ENHANCEMENT FACTOR ($\omega$) | DELAY ENHANCEMENT FACTOR ($\gamma$) |
| EXPLOSION SCENE | 10ms | LOW FREQUENCY BAND+15db | 20ms | LOW FREQUENCY BAND+5db | 200Hz | 2 | 0.5 |
| CONCERT HALL SCENE | 50ms | ENTIRE FREQUENCY BAND+10db | 60ms | ENTIRE FREQUENCY BAND+0db | 200Hz | 0.6 | 0.6 |
| ... | ... | ... | ... | ... | ... | ... | ... |
| ELEPHANT WALKING SCENE | 10ms | LOW FREQUENCY BAND+5db | 20ms | LOW FREQUENCY BAND+5db | 50Hz | 1.3 | 1.2 |
| HORSE WALKING SCENE | 10ms | LOW FREQUENCY BAND+10db | 20ms | LOW FREQUENCY BAND+10db | 75Hz | 1.1 | 1.5 |
| CAR DRIVING SCENE | 15ms | ENTIRE FREQUENCY BAND+10db | 25ms | ENTIRE FREQUENCY BAND+10db | 150Hz | 1.1 | 1.3 |
| CAR SHARP TURN SCENE | 15ms | ENTIRE FREQUENCY BAND+10db | 25ms | ENTIRE FREQUENCY BAND+10db | 200Hz | 0.8 | 1.2 |
| ... | ... | ... | ... | ... | ... | ... | ... |

FIG.11

| VIBRATOR | POSITION COORDINATES |
|---|---|
| FL | 0,20 |
| RL | 0,0 |
| FR | 30,20 |
| RR | 30,0 |

S21
PLOT POSITION INFORMATION OF VIBRATOR
53_FL
53_FR
53_RL
53_RR
S22
PLOT INTERSECTION POINT OF VECTOR OF DIRECTIONAL COMPONENT AND LINE SEGMENT
531
532
535a
535b
535c
535d
525
52
S23
CALCULATE PhS
541
542
S24
CORRECT AMPLITUDE
S25
CALCULATE DELAY TIME
551
552

START
IS XR CONTENT REPLAY START OPERATION DONE?
S101
NO
YES
S102
XR CONTENT SETTING PROCESS
S103
START XR CONTENT REPLAY
S104
SCENE DETECTION PROCESS
S105
PRIORITY SETTING PROCESS
S106
REALISM PARAMETER EXTRACTION PROCESS
S107
OUTPUT PROCESS
S108
IS XR CONTENT FINISHED?
NO
YES
END

| VIBRATOR | DIRECTION | | | | | | | | | | | | | | | |
|---|---|---|---|---|---|---|---|---|---|---|---|---|---|---|---|---|
| | d1 | | d2 | | d3 | | d4 | | d5 | | d6 | | d7 | | d8 | |
| | AMPLITUDE | DELAY | AMPLITUDE | DELAY | AMPLITUDE | DELAY | AMPLITUDE | DELAY | AMPLITUDE | DELAY | AMPLITUDE | DELAY | AMPLITUDE | DELAY | AMPLITUDE | DELAY |
| FL | +2dB | 0ms | -2dB | 0ms | … | … | … | … | … | … | -4dB | 50ms | … | … | … | … |
| RL | -2dB | 50ms | +4dB | 50ms | … | … | … | … | … | … | +4dB | 0ms | … | … | … | … |
| FR | +2dB | 0ms | +4dB | 0ms | … | … | … | … | … | … | +4dB | 50ms | … | … | … | … |
| RR | -2dB | 50ms | -4dB | 50ms | … | … | … | … | … | … | -2dB | 0ms | … | … | … | … |

FIG.23

SOUND SOURCE
5a
51a_FR
51a_FL
51a_RR
51a_RL

4ch SOUND VOLUME RATIO

| FL 0 | FR 10 |
|---|---|
| RL 0 | RR 2 |

SOUND SOURCE
LOCALIZE
5a
51a_FR
51a_FL
51a_RR
51a_RL

INFORMATION PROCESSING DEVICE, INFORMATION PROCESSING SYSTEM, AND INFORMATION PROCESSING METHOD

CROSS-REFERENCE TO RELATED APPLICATIONS

This application is national stage application of International Application No. PCT/JP2022/009472, filed on Mar. 4, 2022, which designates the United States, the entire contents of which are incorporated herein by reference.

FIELD

The present invention relates to an information processing device, an information processing system, and an information processing method.

BACKGROUND

Conventionally, technologies are known to provide users with digital content called cross reality (XR) content, including virtual space experiences such as virtual reality (VR), augmented reality (AR), and mixed reality (MR), for example, using a head mounted display (HMD). XR is a collective expression of all virtual space technologies, including VR, AR, MR, as well as substitutional reality (SR) and audio/visual (AV).

For example, a technology has been proposed to improve a realistic sensation for video by providing the user with vibration associated with video viewed by the user (for example, refer to Japanese Patent Application Laid-open No. 2004-081357).

Another technology has been proposed which controls vibration for each of cells arranged on a seat surface and presents a signal to the user (for example, refer to Japanese Patent Application Laid-open No. 2021-158392).

However, with the conventional technologies, it has been difficult to provide users with a natural sense of vibration localization.

FIG. 3 illustrates a conventional vibration provision method. FIG. 23 is a view of a seat surface of a seat on which a user is seated, as viewed vertically downward from above the user's head.

As illustrated in FIG. 3, the seat surface has vibrators 51*a*_FL (front left), 51*a*_RL (rear left), 51*a*_FR (front right), and 51*a*_RR (rear right). Each of the vibrators has output vibration controlled such that the user feels a sense of vibration localization in accordance with the control content, that is, at the position of a vibration source in the content (at the position with respect to the user position).

For example, assuming that the vibration source (object that produces vibration) in the content is located in front of the user to the right, the vibration intensity of the vibrator 51 at each position is controlled, for example, as illustrated in FIG. 23, 1 for FL (front left), 0 for RL (rear left), 8 for FR (front right), and 1 for RR (rear right), to provide a sense of localization sense of the vibration source.

In this case, the user feels a strong vibration sensation in the right front of the seat surface and thereby can recognize that the vibration source is in front to the right.

However, in such a vibration provision method, the user feels some sense of localization of the vibration source because of the difference in vibration intensity between the seat surface positions, but there are few factors that give the user a sensation of vibration propagation. Thus, there is a demand for a vibration provision method that gives a vivid realistic sensation to make users feel a more sense of vibration localization.

The present invention is made in view of the above and is aimed to provide users with vibrations giving a vivid realistic sensation in replay of content and the like.

Solution to Problem

To solve a problem and to achieve an object, an information processing device for applying vibration according to content to a user by controlling a vibration device provided with a plurality of vibrators, the information processing device includes a controller, wherein the controller identifies a directional component of the object constituting a vibration source in input content and controls an amplitude and a delay of output vibration of each of the vibrators, based on the directional component.

BRIEF DESCRIPTION OF DRAWINGS

FIG. 6 is a diagram illustrating an example of a scene information DB.

FIG. 7 is a diagram illustrating an example of the scene information DB.

FIG. 8 is a diagram illustrating an example of the scene information DB.

FIG. 9 is a table illustrating an example of a priority information DB.

FIG. 10 is a diagram illustrating an example of a parameter information DB.

FIG. 11 is a diagram illustrating an example of a vibrator information DB.

FIG. 20 is a flowchart illustrating a procedure of a vibration localization process.

FIG. 21 is a diagram illustrating an example of the vibrator information DB.

FIG. 23 is a diagram illustrating a conventional vibration provision method.

DESCRIPTION OF EMBODIMENTS

With reference to the accompanying drawings, embodiments of an information processing device, an information processing system, and an information processing method disclosed in this application will be described in detail below. The present invention is not limited by the following embodiments.

First Embodiment

Figure 1:
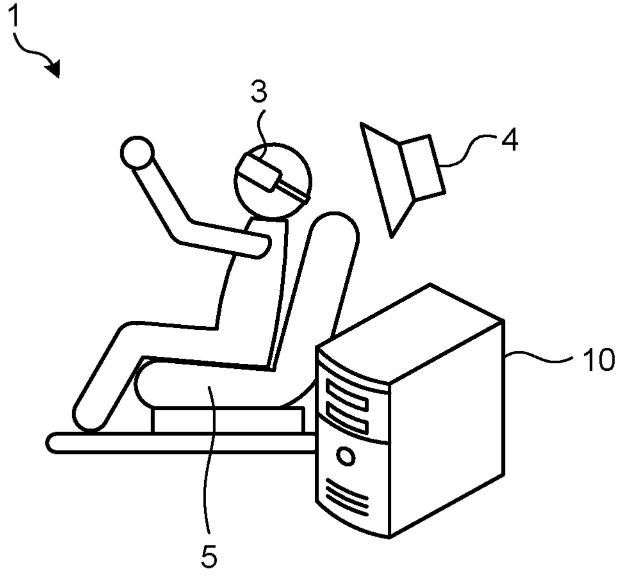
FIG. 1 is a diagram illustrating an overview of an information processing system.
Figure 2:
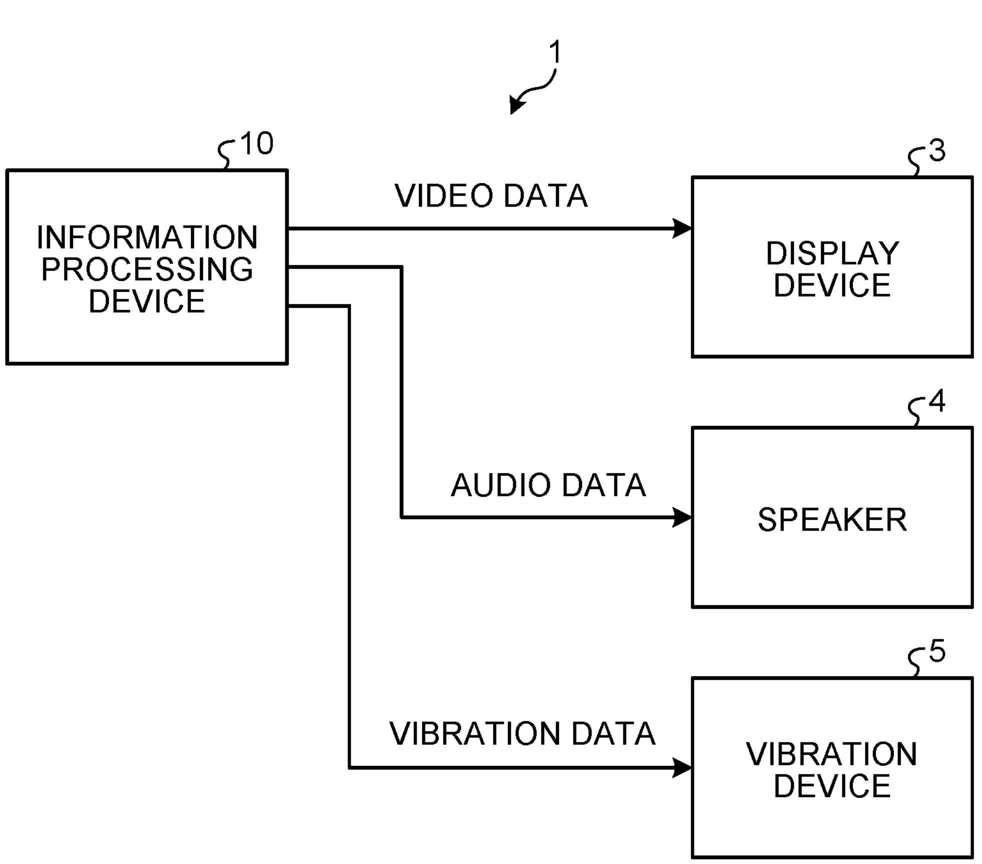
FIG. 2 is a diagram illustrating a flow of data in the information processing system.
Figure 3:
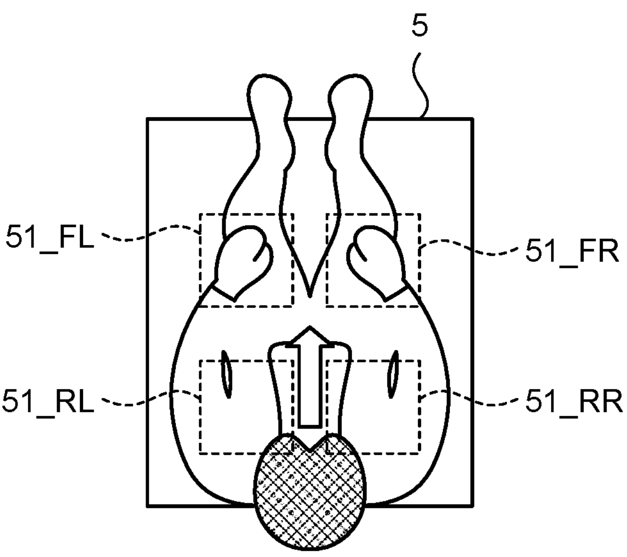
FIG. 3 is a diagram illustrating a configuration example of a vibration device.
Figure 4:
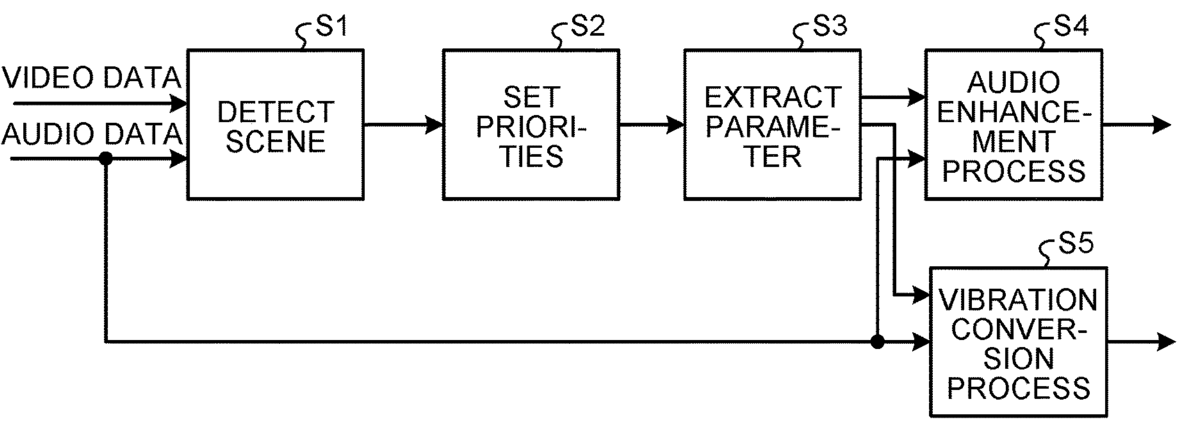
FIG. 4 is a diagram illustrating an overview of an information processing method.

First, an overview of the information processing system and the information processing method according to embodiments will be described using FIGS. 1, 2, 3 and 4. FIG. 1 is a diagram illustrating an overview of the information processing system. FIG. 2 is a diagram illustrating a flow of data in the information processing system. FIG. 3 is a diagram illustrating a configuration example of a vibration device. FIG. 4 is a diagram illustrating an overview of the information processing method. In the following, a case where an XR space (virtual space) is a VR space will be explained.

As illustrated in FIG. 1, an information processing system 1 includes a display device 3, a speaker 4, and a vibration device 5.

As illustrated in FIG. 2, an information processing device 10 provides video data to the display device 3. The information processing device 10 also provides audio data to the speaker 4. The information processing device 10 also provides vibration data to the vibration device 5.

As illustrated in FIG. 1, the display device 3 is, for example, a head mounted display. The display device 3 is an information processing terminal for presenting video data related to XR content provided by the information processing device 10 to the user and allowing the user to enjoy VR experiences.

The display device 3 may be a non see-through type that completely covers the field of view, or may be a video see-through type or an optical see-through type. The display device 3 includes a device that detects changes in user's internal and external situations with a sensor, such as a camera and a motion sensor.

The speaker 4 is an audio output device that outputs sound and is provided, for example, in the form of headphones to be worn on the user's ears. The speaker 4 generates audio data provided by the information processing device 10 as sound. The speaker 4 is not limited to a headphone type and may be a box type (installed on the floor or the like). The speaker 4 may be a stereo audio or multi-channel audio type.

The vibration device 5 includes a plurality of vibrators. Each of the vibrators includes an electricity-to-vibration converter including an electro-magnetic circuit and a piezoelectric element, is installed, for example, in a seat on which the user is seated, and vibrates in accordance with vibration data provided by the information processing device 10. The information processing device 10 individually controls each vibrator of the vibration device 5.

FIG. 3 is a view of a seat surface of a seat on which a user is seated, as viewed vertically downward from above the user's head. As illustrated in FIG. 3, the vibrators of the vibration device 5, namely, vibrators 51_FL, 51_RL, 51_FR, and 51_RR, are installed at the left front, left rear, right front, and right rear positions on the seat surface of the seat.

When the user is seated on the seat, the vibrators come into contact with different body parts to provide vibrations. For example, the vibrators 51_FL, 51_RL, 51_FR, and 51_RR provide vibrations to the left thigh, left buttock, right thigh, and right buttock, respectively, of the user seated on the seat.

Sound from the speaker 4 and vibrations from the vibration device 5, in other words, waves from wave devices are adapted to the replayed video and applied to the content user, thereby increasing a realistic sensation in video replay.

The information processing device 10 is constituted with a computer and connected to the display device 3 in a wired or wireless manner to provide videos of XR content to the display device 3. The information processing device 10, for example, acquires changes in situation detected by the sensor in the display device 3 as necessary and reflects such changes in situation in the XR content.

For example, the information processing device 10 can change the orientation of the field of view in the virtual space of XR content in response to changes in user's head and line of sight detected by the sensor.

In providing XR content, the realistic sensation of XR content can be improved by enhancing sound generated from the speaker 4 according to the scene or allowing the vibration device 5 to vibrate according to the scene.

However, parameters used for controlling a realistic sensation to improve such realistic sensation (hereafter referred to as "realism parameters") need to be set manually after creation of XR content, resulting in an enormous amount of work to set the realism parameters.

The information processing method is then aimed to automate the setting of these realism parameters. For example, as illustrated in FIG. 4, first, in the information processing method according to embodiments, scenes that satisfy a predetermined condition are detected from video and audio data related to XR content (step S1).

As used herein the predetermined condition is, for example, a condition about whether the corresponding video or audio data is a scene that requires the setting of realism parameters, and is defined, for example, by a conditional expression on a situation inside the XR content.

In other words, in the information processing method, if the situation inside the XR content satisfies the condition defined by a conditional expression, the scene is detected as a scene that satisfies the predetermined condition. In the information processing method, this process eliminates the need for processing such as detailed analysis of video data, thereby reducing the processing load for scene detection.

Subsequently, in the information processing method, priorities are set for the scenes detected by scene detection (step S2). As used herein the priorities indicate the order, such as which scene's realism parameters are to be given priority. In other words, in the information processing method, which scene's realism parameters are to be given priority when multiple scenes overlap in time is defined in advance for each scene.

This configuration can provide the user with a suitable realistic sensation even when multiple scenes overlap. As described below, in the information processing method, priorities for sound and priorities for vibration are set separately.

Subsequently, in the information processing method, realism parameters are extracted for each scene (step S3). For example, in the information processing method, realism parameters are extracted for each scene, using parameter information in which the relationship between scenes and realism parameters is predefined.

In this case, in the information processing method, the corresponding realism parameters are extracted according to the priorities. Specifically, for example, in the information processing method, when a scene with a low priority overlaps with a scene with a high priority, realism parameters of the scene with a high priority are extracted.

In the information processing method, an audio enhancement process is performed to enhance audio data, using an audio enhancement parameter among the extracted realism parameters (step S4), and the processed data is output to the speaker 4. In the information processing method, a vibration conversion process is performed to convert audio data into vibration data, and then the vibration data is enhanced using a vibration parameter among the extracted realism parameters (step S5), and then the processed data is output to the vibration device 5.

In the information processing method, this configuration can provide the user with sound enhanced according to the scene that the user is viewing and with vibrations suitable for the scene.

In this way, in the information processing method according to embodiments, a scene is detected from XR content, and after setting a priority, realism parameters related to wave control including audio processing and vibration processing are extracted for the scene. The information processing method according to embodiments therefore can automate the setting of realism parameters related to the improvement in realistic sensation of content.

Furthermore, at step S5, the information processing device 10 identifies a directional component of a sound source relative to the vibration device 5 in the input content. The information processing device 10 then controls output vibrations of a plurality of vibrators, based on the identified directional component. The information processing device 10 thus can provide the user with a sense of vibration localization.

Figure 5:
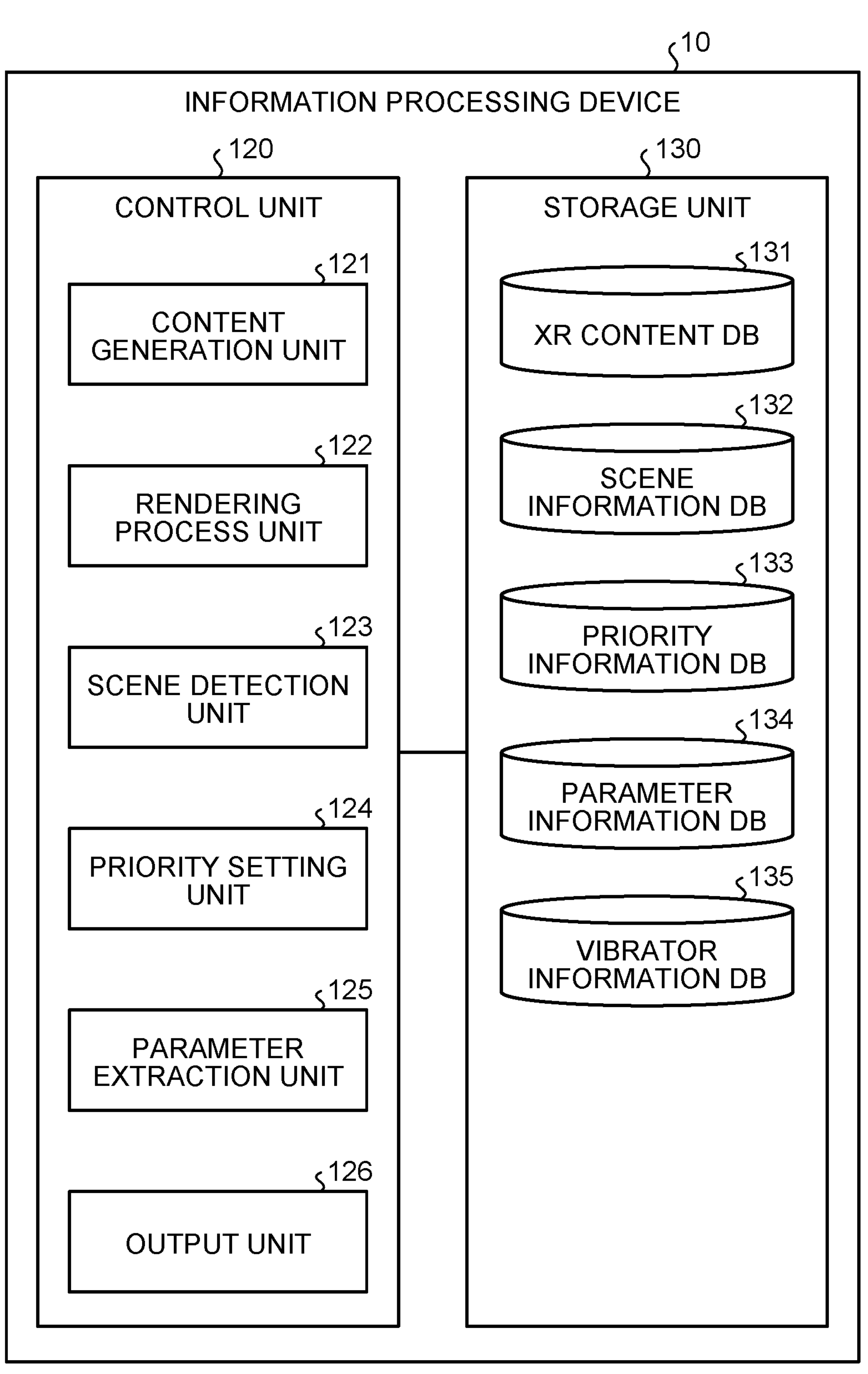
FIG. 5 is a block diagram of an information processing device.

Referring now to FIG. 5, a configuration example of the information processing device 10 according to embodiments will be described. FIG. 5 is a block diagram of the information processing device 10. As illustrated in FIG. 5, the information processing device 10 includes a control unit 120 and a storage unit 130.

The storage unit 130 is implemented, for example, by a semiconductor memory device such as random access memory (RAM) or flash memory, or other storage devices such as hard disk or optical disk. In the example illustrated in FIG. 5, the storage unit 130 includes an XR content database (DB) 131, a scene information DB 132, a priority information DB 133, a parameter information DB 134, and a vibrator information DB 135.

The XR content DB 131 is a database that stores a group of XR contents to be displayed on the display device 3. The scene information DB 132 is a database that stores various information about scenes to be detected.

FIGS. 6 to 8 are diagrams illustrating examples of the scene information DB 132. As illustrated in FIG. 6, for example, the scene information DB 132 stores information on items, such as "detection scene", "condition category", "target", "condition parameter", "threshold", and "conditional expression" which are associated with each other.

The "detection scene" indicates the name of a scene to be detected. The "detection scene" functions as an identifier and usually employs a code such as a numerical value, but in this example, employs a name (duplication prohibited) for the sake of clarity of explanation. The "condition category" indicates a category, such as based on what information a scene is detected. In the example illustrated in the figure, the categories mainly include positional relationship between user and target, user's action, spatial information where the user is present, temporal information where the user is present, and generation of sound from the target. The user here refers to the operator himself/herself in the XR space.

The "target" indicates a target for scene detection. In the example illustrated in the figure, information such as OBJECT 1, OBJECT 2, user, SPACE 1, SPACE 1+OBJECT 3, CONTENT 1, OBJECT 4, OBJECT 5, or OBJECT 6 corresponds to the target. Here, OBJECT 1, OBJECT 2, OBJECT 3, OBJECT 4, OBJECT 5, and OBJECT 6 represent different objects in the XR space. SPACE 1 represents, for example, a space in the XR space where the user is present. CONTENT 1 represents, for example, a predetermined event in the XR space.

The "condition parameter" indicates a condition about a parameter, such as which parameter is used for scene detection. As illustrated in the figure, for example, information such as distance, angle, speed, acceleration, rotational speed, inside space, presence of object, quantity, start time to end time, and audio pattern is associated.

The "threshold" indicates a threshold corresponding to a condition parameter. The "conditional expression" indicates a conditional expression for detecting a detection scene. For example, the relationship between the condition parameter and the threshold is defined as a conditional expression.

In FIG. 6, for the sake of explanation, signs such as "W", "4", and "w" are used to denote item values, such as "SCENE W", "OBJECT 4", and "PATTERN w". In actuality, each item value is stored as data in a manner that its specific meaning is understandable.

For example, "SCENE W", "SCENE X", "SCENE Y", and "SCENE Z" are actually data such as "elephant walking scene", "horse walking scene", "car driving scene", and "car sharp turn scene", respectively.

In this case, "OBJECT 4", "OBJECT 5", and "OBJECT 6" are actually data such as "horse", "elephant", and "car", respectively.

Furthermore, "PATTERN w", "PATTERN x", "PATTERN y", and "PATTERN z" are actually data, such as "pattern of horse walking sound", "pattern of elephant walking sound", "pattern of car driving sound", and "pattern of tire squeal sound", respectively.

An audio pattern is represented, for example, by a feature vector having audio features as elements. For example, the features may be obtained by performing spectral decomposition on an audio signal (for example, mel-filter bank or cepstrum).

Then, if the similarity (for example, cosine similarity, Euclidean distance) between the feature vectors corresponding to two audio patterns is equal to or greater than a threshold, it can be said that the two audio patterns are similar.

For example, "audio pattern similar to PATTERN w" means that the similarity between a feature vector calculated from sound produced in a scene and a feature vector of sound corresponding to PATTERN w is equal to or greater than a threshold.

The threshold for the similarity between audio patterns may also be included in the "threshold" in the scene information DB 132.

The information processing device 10 may, for example, use a combination of condition categories or condition parameters illustrated in FIG. 6 to detect a scene. For example, as illustrated in FIG. 7, a detection scene may be set by combining the condition categories of multiple scenes, or as illustrated in FIG. 8, a detection scene may be set by combining the condition parameters of multiple scenes.

For example, the setting of a new detection scene can be simplified by thus combining the condition categories or the condition parameters.

Returning to the description of FIG. 5, the priority information DB 133 will be described. For example, the information processing device 10 according to embodiments sets a priority for each scene on a rule basis. The priority information DB 133 stores various information about the priorities of the realism parameters. FIG. 9 is a table illustrating an example of the priority information DB 133.

As illustrated in FIG. 9, for example, the priority information DB 133 stores information on items such as "rule number" and "priority rule" which are associated with each other. The "rule number" indicates a number for identifying a priority rule, and the "priority rule" indicates a rule about priorities.

"Priority to scene detected earlier" and "Priority to scene detected later (switch to later scene)" denoted in the figure indicates that priority is given to the realism parameter of a scene that comes earlier or later in time. This configuration makes rules easier, for example, in setting the priorities of scenes.

"Priority to particular parameter with greater weight" indicates that priority is given to the realism parameter of a scene with a greater one of the audio enhancement parameter or the vibration parameter, among the realism parameters.

In other words, in this case, since the realism parameter extracted for a scene with a greater one of the audio enhancement parameter or the vibration parameter is set, the realism parameter can be provided in conjunction with audio data to be significantly enhanced or greater vibration data.

"Priority to parameter with greater weight" indicates that priority is given to the realism parameter of a scene with a greater one of the audio enhancement parameters or the vibration parameters, among the realism parameters. In the case of this rule, parameters of different scenes may be used for the audio enhancement parameter and the vibration parameter.

In other words, in this case, since each of vibration data and audio data can be enhanced with the realism parameter having a greater value, the realistic sensation of each of the vibration data and the audio data can be improved. The magnitude of the weight here indicates, for example, the magnitude of value of the parameter.

"Priority to parameter of shorter scene" indicates that priority is given to the realism parameter of a scene with a shorter time length. If a scene with a short duration interrupts the replay of a scene with a long duration, the realism parameter of the scene with a short duration is set preferentially during the scene with a short duration.

This configuration allows, for example, the scene with a short duration to be suitably enhanced. A rule may be set to give priority to the parameter of the longer scene.

"Priority to greater amplitude in low frequency range" indicates that when scenes in which a target is generating sound occur simultaneously, priority is given to the scene corresponding to a target that is generating sound with a greater amplitude in the low frequency band (for example, below 500 Hz).

In general, the larger a living creature, the greater the amplitude in the low frequency band of walking sound of the living creature. Thus, for example, when an elephant walking scene and a horse walking scene are detected, priority is given to the elephant walking scene according to the rule "priority to greater amplitude in low frequency band".

"Priority to scene with large temporal variations in sound or video" indicates that priority is given to a scene with large variations in volume of sound generated by a target or in position of a target in the video over a unit of time.

"Priority to scene with target near the center of field of view" indicates that priority is given to a scene corresponding to a target located near the center of the screen in content video. This rule will be explained later using FIG. 14.

"Priority to SCENE X over SCENE W" indicates that priority is given to SCENE X when SCENE W and SCENE X are detected. In this way, a person (designer or developer) may manually define a priority rule in advance for two or more particular scenes.

Returning to the description of FIG. 5, the parameter information DB 134 will be described. The parameter information DB 134 is a database that stores information about the realism parameters for each scene. FIG. 10 is a diagram illustrating an example of the parameter information DB 134.

As illustrated in FIG. 10, the parameter information DB 134 stores information on items such as "scene name", "audio enhancement parameter", and "vibration parameter" which are associated with each other.

The "scene name" indicates the name of a detection scene described above and corresponds to the "detection scene" illustrated in FIG. 6 and other figures. For the sake of clarity of explanation, "scene name" is denoted by explosion scene, concert hall scene, elephant walking scene, horse walking scene, car driving scene, and car sharp turn scene.

The "audio enhancement parameter" indicates an audio enhancement parameter to be set in the corresponding scene. For example, as illustrated in FIG. 10, as the audio enhancement parameters, individual parameters for speakers 4, such as "for speaker 1" and "for speaker 2", are stored according to the number of speakers 4.

For each speaker 4, for example, the values of parameters of items related to audio processing such as "delay" and "band enhancement/attenuation" are stored. For example, "delay" indicates a parameter related to the time of delay, and "band enhancement/attenuation" indicates a parameter such as which band of sound is enhanced or attenuated and by how much.

The "vibration parameter" indicates a parameter related to vibration to be set in the corresponding scene. For example, parameters of items such as "low pass filter (LPF)", "amplitude enhancement factor (ω)", and "delay enhancement factor (γ)" are stored as "vibration parameter".

"LPF" indicates a parameter (cut-off frequency in the example illustrated in FIG. 10) related to a low-pass filter used for vibration generation. The "amplitude enhancement factor (ω)" indicates a parameter related to amplification and attenuation of the amplitude of vibration used for vibration generation. The "delay enhancement factor (ω)" indicates a parameter related to the delay of vibration generation time used for vibration generation.

Returning to the description of FIG. 5, the vibrator information DB 135 will be described. The vibrator information DB 135 is a database that stores information about the vibrators included in the vibration device 5. FIG. 11 is a diagram illustrating an example of the vibrator information DB.

As illustrated in FIG. 11, the vibrator information DB 135 stores information on items such as "vibrator" and "position coordinates" which are associated with each other.

The "vibrator" indicates information for identifying a vibrator included in the vibration device 5. The "position coordinates" indicates the position of a vibrator by coordinates.

Here, "FL", "RL", "FR", and "RR" denoted in "vibrator" correspond to the vibrators 51_FL, 51_RL, 51_FR, and 51_RR in FIG. 3, respectively. The "position coordinates" may be set by the installer when each vibrator is installed in the vibration device 5.

For example, the positional relationship between vibrators can be grasped by referring to the vibrator information DB 135.

Returning to the description of FIG. 5, the control unit 120 will be described. The control unit 120 is a controller, which is implemented when, for example, a central processing unit (CPU) or micro processing unit (MPU) executes various programs (not illustrated in the figure) stored in a storage unit 130 using a RAM as a work area. The control unit 120 may be implemented by an integrated circuit such as an application-specific integrated circuit (ASIC) or field-programmable gate array (FPGA).

The control unit 120 includes a content generation unit 121, a rendering process unit 122, a scene detection unit 123, a priority setting unit 124, a parameter extraction unit 125, and an output unit 126 to implement or execute the functions and actions of information processing described below.

The content generation unit 121 generates a 3D model for a space in XR content. For example, the content generation unit 121 refers to the XR content DB 131 to generate a 3D model for a space in XR content according to the user's current field of view in the XR content. The content generation unit 121 passes the generated 3D model to the rendering process unit 122.

The rendering process unit 122 performs a rendering process to convert the 3D model received from the content generation unit 121 into video and audio data. For example, the rendering process unit 122 outputs the converted video data to the display device 3 (refer to FIG. 2) and passes it to the scene detection unit 123. The rendering process unit 122 passes the converted audio data to the output unit 126 and the scene detection unit 123. The content generation unit 121 and the rendering process unit 122 serve as a calculation unit that calculates condition data for the items in the conditional expressions from the content.

The scene detection unit 123 detects a scene that satisfies a predetermined condition from the input content. For example, the scene detection unit 123 detects a scene for which the realism parameters are to be set, using video data input from the rendering process unit 122 and a conditional expression stored in the scene information DB 132.

In this case, for example, the scene detection unit 123 receives coordinates information of an object in the XR space and information about the object type from the rendering process unit 122, and detects a scene for which the realism parameters are to be set, using the conditional expression.

For example, when the XR content is MR content, for example, the scene detection unit 123 may recognize objects in the MR space or calculate the coordinates of objects by performing image analysis on an image taken in the MR space.

Figure 12:
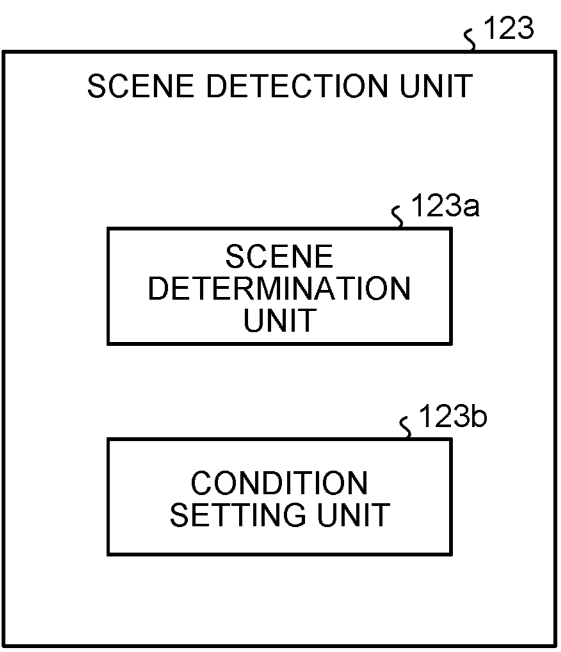
FIG. 12 is a block diagram of a scene detection unit.

FIG. 12 is a block diagram of the scene detection unit 123. As illustrated in FIG. 12, for example, the scene detection unit 123 includes a scene determination unit 123*a* and a condition setting unit 123*b*. The scene determination unit 123*a* determines whether the situation in video data satisfies a detection condition for each scene, using each condition data (conditional expression) for scene determination that is stored in the scene information DB 132.

More specifically, for example, as illustrated in FIG. 6, the scene determination unit 123*a* determines whether the current situation in the XR space corresponds to each of the predefined detection scenes, based on data on the items in the conditional expressions (calculated by the content generation unit 121 or the rendering process unit 122 from the content), such as the positional relationship between the user and the target (object in the XR space), the user's action, and spatial information where the user is present.

Here, the scene determination unit 123*a* performs a scene detection process, using data in the form of text information already calculated by the content generation unit 121 or the rendering process unit 122, such as user's motion in the XR space, object coordinate information, and information about the object type, and spatial information.

With this configuration, for example, even when CPU performance is relatively low, the process from scene detection to extraction of realism parameters can be performed in parallel with a process with a relatively heavy processing load, such as the rendering process by the rendering process unit 122.

In this case, for example, the scene determination unit 123*a* may determine whether the current situation in the XR space corresponds to each detection scene, based on scene determination information including a combination of condition categories, as illustrated in FIG. 7, or a combination of condition parameters, as illustrated in FIG. 8.

If it is determined that the situation corresponds to a detection scene, the scene determination unit 123*a* passes the detection scene information for the video data to the priority setting unit 124 (refer to FIG. 5). If the scene determination unit 123*a* determines that the situation does not correspond to any of the detection scenes, the realism parameters are returned to the initial state (the realism parameters for no applicable detection scene) as no detection scene being applicable. If it is determined that the current situation in the XR space corresponds to multiple detection scenes, the scene determination unit 123*a* passes the determined multiple detection scenes to the priority setting unit 124.

Although the case in which the scene determination unit 123*a* determines whether there is any applicable detection scene based on video data has been described here, the scene determination unit 123*a* may determine whether there is any applicable detection scene based on audio data.

The scene determination unit 123*a* detects, from the input content, scenes in which sound is generated from a target. The scenes detected in this case correspond to SCENE W, SCENE X, SCENE Y, and SCENE Z (elephant walking scene, horse walking scene, car driving scene, and car sharp turn scene) in FIG. 6.

For example, the scene determination unit 123*a* calculates the similarity between a feature vector obtained from an audio signal of the content and a predetermined feature vector (for example, PATTERN w), and determines whether the similarity is equal to or greater than a threshold.

The condition setting unit 123*b* sets various conditional expressions for scene detection. The condition setting unit 123*b* sets conditional expressions based on information input from, for example, the creator of the XR content or the user.

For example, the condition setting unit 123*b* accepts, from the creator or the user, input of information such as what kind of realism parameters are to be set and for what kind of scene, and translates the situation of such a scene into a conditional expression. Every time a conditional expression is set, the condition setting unit 123*b* writes information about the conditional expression into the scene information DB 132 and writes the corresponding realism parameters into the parameter information DB 134.

The condition setting unit 123*b* may set the scene information DB 132 and the parameter information DB 134 in advance, based on the content that the user views.

The condition setting unit 123*b* can set a condition for detecting a scene in which a target generates sound in the specified low frequency domain. For example, the condition setting unit 123*b* adds a record of a scene that contains elephant walking sound including sound in the low frequency domain, as a detection scene, to the scene information DB 132 (corresponding to the record of SCENE W in FIG. 6).

By recognizing images and sounds contained in the content, the condition setting unit 123*b* can identify that a target (for example, elephant) is in the scene and that sound in the low frequency domain is being generated.

The condition setting unit 123*b* determines the value of "vibration parameter" in the parameter information DB 134, in accordance with the size of the target and the amplitude of each frequency band in the low frequency domain.

This configuration allows the scene information DB 132 and the parameter information DB 134 to be set automatically.

The condition setting unit 123*b* sets a condition, based on, among the scenes in the content, a scene in which the amplitude of sound in the low frequency domain generated by the target exceeds a threshold.

For example, the threshold here may be the same as a threshold used to cut the low frequency domain in noise cancellation.

The threshold may be determined by the types (details) of content. The types of content include music videos for allowing users to listen primarily to music, animal documentaries for explaining the biology of animals, and the like.

In elephant walking scenes in music videos, it may be better not to generate excessive vibrations in order to avoid disturbing the music. On the other hand, in elephant walking scenes in animal documentaries, it may be better to generate vibrations to create a realistic sensation.

By setting the threshold in music videos lower than the threshold in animal documentaries, the condition setting unit 123*b* is less likely to consider the elephant walking scene in music videos as a target scene for which vibration is generated.

This configuration makes it possible to generate vibrations suitable for the content.

The above setting process for the scene information DB 132 and the parameter information DB 134 may be performed by a person actually viewing content and operating an input device, instead of the condition setting unit 123*b*.

This configuration enables the information processing device 10 to detect scenes desired by the producer or user, and to set the realism parameters desired by the producer or user for the detected scenes.

Returning to the description of FIG. 5, the priority setting unit 124 will be described. The priority setting unit 124 sets priorities for the scenes detected by the scene detection unit 123.

For example, the priority setting unit 124 refers to the priority information DB 133 to select the processing of which scene is to be given priority when multiple types of scenes are simultaneously detected and determined by the scene detection unit 123. When only one scene is detected and determined by the scene detection unit 123, the highest priority is given to the one scene.

Figure 13:
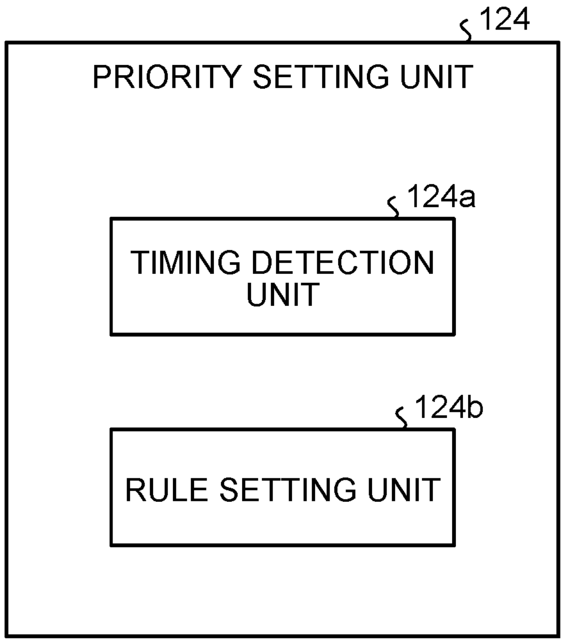
FIG. 13 is a block diagram of a priority setting unit.

FIG. 13 is a block diagram of the priority setting unit 124. For example, as illustrated in FIG. 13, the priority setting unit 124 includes a timing detection unit 124*a* and a rule setting unit 124*b*.

The timing detection unit 124*a* detects the timing at which a scene detected by the scene detection unit 123 occurs and the timing at which it ends. For example, the timing detection unit 124*a* detects scenes existing at each point in time (also grasps the overlapping state), the occurrence timing of the existing scene, and the timing at which the existing scene disappears, based on the scene information at each point in time from the scene detection unit 123. In other words, the timing detection unit 124*a* grasps the states of all the scenes existing at each point in time, including their order of occurrence.

The rule setting unit 124*b* sets the priorities of scenes to be used for determining the realism parameters, for the scenes detected by the scene detection unit 123. In other words, the priorities are set for detection scenes in order to determine which scene's parameters are to be used preferentially for the realism parameters to be used at the point in time, based on the states of all the existing scenes that are grasped by the timing detection unit 124*a*. This configuration allows the information processing device 10 to set the realism parameters according to the priorities.

In other words, by setting a priority condition for each scene in advance, the information processing device 10 can appropriately determine which scene's realism parameters are to be used first when SCENE A and SCENE B overlap in time.

For example, the rule setting unit 124*b* refers to the priority information DB 133 and sets priorities of scenes for which parameters to be used are determined, for each of the audio enhancement parameter and the vibration parameter. In this case, the rule setting unit 124*b* may set a scene to be used for parameter selection, for example, based on an independent priority rule for each speaker 4.

As a result, the realism parameters are set in each speaker 4 according to its own rule, thereby further improving a realistic sensation compared when the realism parameters are set equally.

The rule setting unit 124*b* also passes information about the set rule in association with video and audio data to the parameter extraction unit 125 (refer to FIG. 5).

Returning to the description of FIG. 5, the parameter extraction unit 125 will be described. The parameter extraction unit 125 extracts the realism parameters for the scene detected by the scene detection unit 123.

Figure 15:
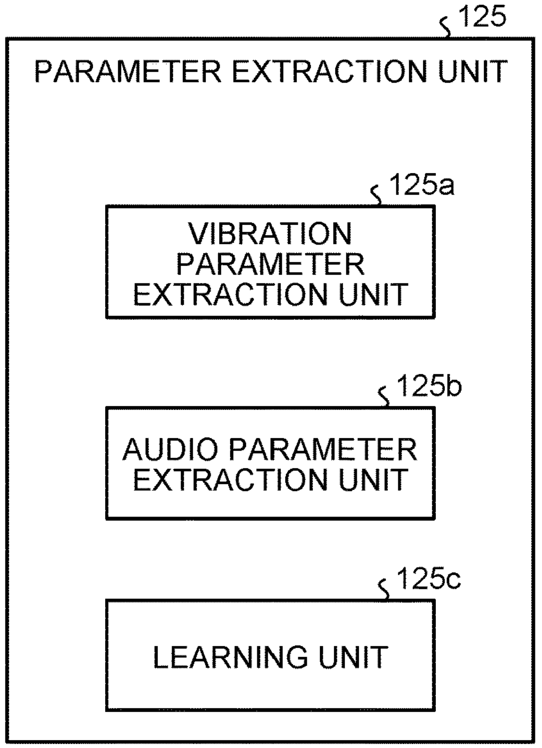
FIG. 15 is a block diagram of a parameter extraction unit.

FIG. 15 is a block diagram of the parameter extraction unit 125. As illustrated in FIG. 15, the parameter extraction unit 125 includes a vibration parameter extraction unit 125*a*, an audio enhancement parameter extraction unit 125*b*, and a learning unit 125*c*.

The vibration parameter extraction unit 125*a* refers to the parameter information DB 134 and extracts a vibration parameter corresponding to the scene that is given the highest priority by the priority setting unit 124. For example, the vibration parameter extraction unit 125*a* extracts a vibration parameter corresponding to the scene by extracting from the parameter information DB 134 the vibration parameter corresponding to the "detection scene" with the highest priority that is received from the priority setting unit 124.

In other words, when the scene detection unit 123 detects multiple scenes overlapping in time and in which targets generating sound are different from each other, the parameter extraction unit 125 can select a scene with a higher priority, that is, a scene estimated to give the user a more realistic sensation by vibrations, and can extract a parameter for vibration generation corresponding to the selected scene. As a result, even during a content replay period in which multiple scenes overlap, it is possible to generate vibrations that give a realistic sensation using an appropriate parameter.

Specifically, the scene detection unit 123 can implement such a scene selection process, based on the priority rules in the priority information DB illustrated in FIG. 9 and the settings of the priority condition for each scene (set and stored in the scene information DB illustrated in FIG. 4).

For example, when the scene detection unit 123 detects a scene in which an elephant generates a walking sound (elephant walking scene) and a scene in which a horse generates a walking sound (horse walking scene), the parameter extraction unit 125 gives priority to the elephant walking scene according to the rule "priority to greater amplitude in low frequency band". As a result, vibrations that reproduce vibrations caused by elephant walking, which are also primarily felt in the real world, are applied to the user in content replay (for example, virtual space) to allow the user to feel a vibration feeling with a vivid realistic sensation, that is, close to reality.

When the scene detection unit 123 detects multiple scenes different from each other and overlapping in time and in which targets generating sound are present, the parameter extraction unit 125 may apply a method of extracting a parameter corresponding to a scene selected from among multiple scenes, based on the type and location of a target corresponding to each of the multiple scenes in images contained in the content.

Specifically, the scene detection unit 123 can implement execution of such a scene selection process, by setting the settings of the priority rules in the priority information DB illustrated in FIG. 9 and the priority condition for each scene (set and stored in the scene information DB illustrated in FIG. 4) (in the present example, a function value F(M,d) of the type (m) of the target and the distance (d) to the target is added to the priority conditions, and the condition by the function value F(M,d) (for example, priority is given to a larger function value F(M,d)) is added to the priority rules).

Figure 14:
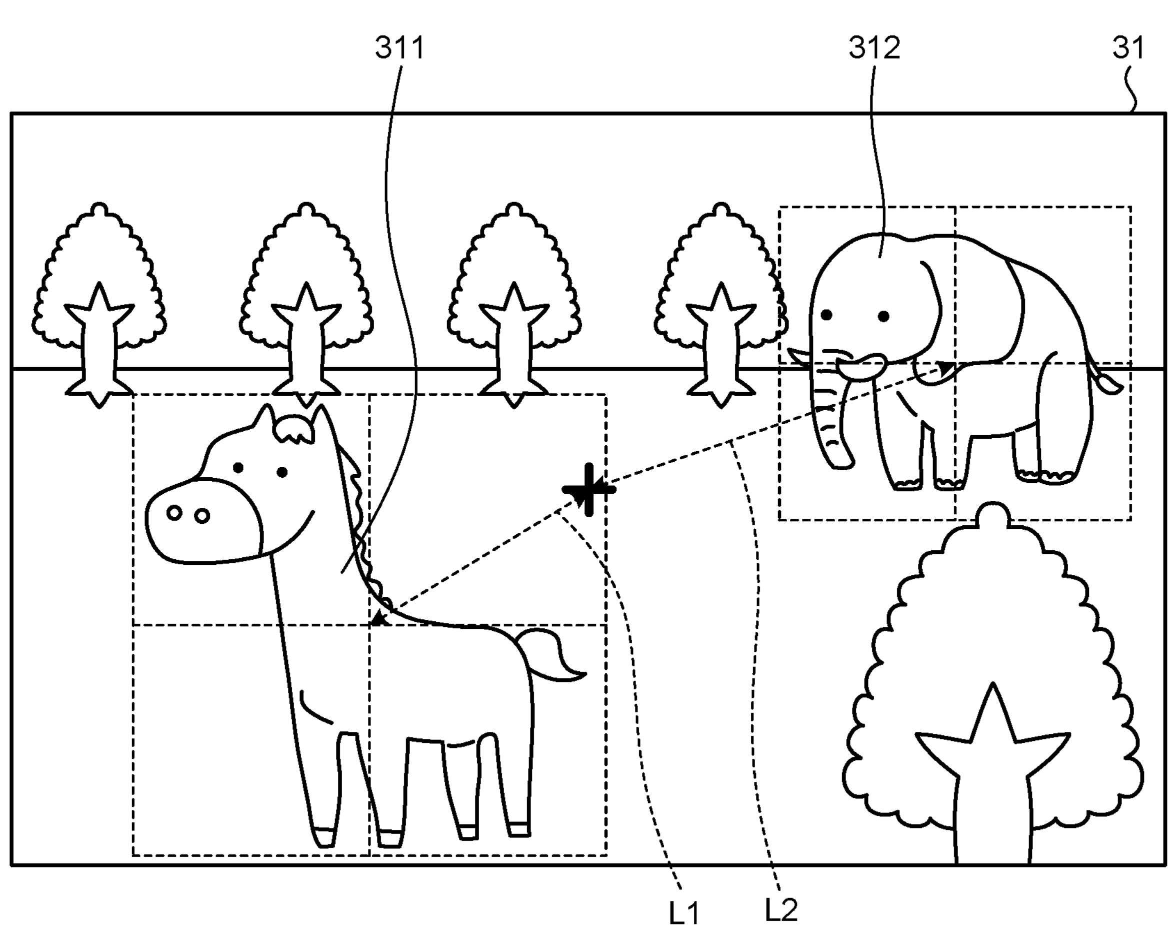
FIG. 14 is a diagram illustrating an example of a method of determining a target with a higher priority.

A method of determining a scene with a higher priority based on the position of the target will be described using a specific example illustrated in FIG. 14. FIG. 14 is a diagram illustrating an example of a method of determining a target with a higher priority.

As illustrated in FIG. 14, it is assumed that the display device 3 presents an image 31 of the content being replayed. The image 31 includes an object 311 (horse) and an object 312 (elephant). In this case, it is assumed that the scene detection unit 123 has detected both a horse walking scene and an elephant walking scene that satisfy the conditions as target scenes for vibration control.

It is assumed that the distance from the reference position (the user position for the content image, for example, the position of the avatar corresponding to the user in XR content) to the object 311 is L1. On the other hand, it is assumed that the distance from the reference position to the object 312 is L2. The reference vibration intensities of the objects 311 and 312 (the low-frequency component intensities of the audio signals of the objects in the content) are V1 and V2, respectively. Furthermore, the priority condition is set to "priority to greater value of function F(Ln, Vn)=Vn/(Ln, Ln)" by way of example.

The distance from the reference position to the object is calculated, for example, based on information added to the content (for example, calculated based on the position information of each object used for video generation in XR content). The reference vibration intensities of the objects can be implemented by reading from a data table in which a preset reference vibration intensity is stored for each object type, according to the type of the target object, or by adding to the content as content information. Since audio data is often added to content for audio replay, the reference vibration intensity can be calculated based on the low-frequency characteristics (audio intensity level, low-frequency signal level, etc.) of the audio data (vibration patterns are highly correlated with the low-frequency components of sound, and vibrations are often generated based on the low-frequency components of sound).

In this way, the information processing device 10 can estimate the low-frequency characteristics of sound generated by a vibration generation target in the content. In this case, the information processing device 10 selects a vibration generation target based on the estimated low-frequency characteristics. This configuration enables more appropriate selection of a vibration generation target.

An example of the low-frequency characteristics of sound is a low-frequency signal level. In this case, the information processing device 10 selects a vibration generation target whose estimated low-frequency signal level exceeds a threshold. The information processing device 10 can extract the low-frequency signal level from audio data. This configuration makes it possible to easily select a vibration generation target using the low-frequency signal level contained in audio data.

The threshold for the low-frequency signal level is set according to the content type. As described above, it is often better to generate vibrations in music videos compared to animal documentaries, even when the target is the same. In this way, it is possible to select a vibration target suitable for the content type (music video, animal documentary, etc.).

In this case, if the relationship between function values of the object 311 (horse) and the object 312 (elephant) is function F(L1, V1)>function F(L2, V2), the scene in which the object 311 is generating sound (vibrations), that is, the horse walking scene, is selected preferentially, and the parameter extraction unit 125 extracts a vibration parameter corresponding to the horse walking scene. Vibrations corresponding to the horse walking scene are then applied to the user. Subsequently, for example, if the object 312 (elephant) approaches the reference position and the relationship changes to function F(L1, V1)<function F(L2, V2), the scene in which the object 311 is generating sound (vibrations), that is, the elephant walking scene, is selected preferentially and, the parameter extraction unit 125 extracts a vibration parameter corresponding to the elephant walking scene. Vibrations corresponding to the elephant walking scene are then applied to the user.

If the function F(Ln, Vn) is smaller than a predetermined threshold, that is, the vibrations caused by the target at the user's position in the content (the virtual space of a game, etc.) are small (the user does not feel vibrations so much, that is, there is little need to apply vibrations), it is also effective not to select the target as a target for which vibration is generated. In other words, it is also effective to select, as a target for which vibration is generated, only the object in the content in which vibrations caused by the target at the user's position in the content (the virtual space of a game, etc.) are large to some extent (to the extent that the user can feel improvement in realistic sensation if vibrations are reproduced). In other words, the target that has a large effect on a vibration signal to be generated (that is, the vibration target whose vibrations are strongly felt by the user) is selected from candidate targets which are candidates for the vibration generation target.

This configuration allows the information processing device 10 to estimate a candidate target that has a large effect on a vibration signal to be generated from candidate targets which are candidates for the vibration generation target, and to select the candidate target as a vibration generation target. As a result, vibrations that match the user's sensations in real space are applied to the user to enable replay of content with a vivid realistic sensation.

In this case, it is preferable that the threshold for selecting a target for which vibration is generated is changed based on the content type. This is because, depending on the details of content, it is preferable to refrain from reproduction of vibrations or to enhance vibrations by an object appearing in the content, and it is preferable to adjust a determination setting (determination level) for a target for which vibration is generated.

More specifically, the principle of vibration generation is as follows. A target for which vibration is generated in the content (each scene thereof) is determined based on the details of the content. A vibration signal (vibration data) is then generated (for example, generated by extracting and adequately amplifying the low frequency component of the audio signal of the target), based on an acoustic signal (audio data of the target contained in the content, or audio data of the target generated from audio data in the scene (for example, extracted by filtering the low frequency domain)) corresponding to the determined target.

A method for determining a target for which vibration is generated involves: estimating the low-frequency characteristics (for example, volume level) of produced sounds in sound-generating objects in the content (in the case of the above example, estimating based on the reference vibration intensity based on the type of objects and the distance between the reference position (such as the user presence position in the virtual space of the content) and the object); and determining a target (determining a sound-generating object with the higher low-frequency volume level of the produced sound, as a target for which vibration is generated).

In this way, a scene with a higher priority is determined based on the target's position, whereby vibrations that are more adapted to the user's visual intuition, that is, vibrations that match the user's sensation in real space are applied to the user to enable replay of content with a vivid realistic sensation.

In this case, the vibration parameter extraction unit **125*a* extracts a corresponding vibration parameter for each vibration device 5**. This process can further improve the realistic sensation compared to when vibration parameters are extracted equally.

The audio enhancement parameter extraction unit **125*b* refers to the parameter information DB 134 and extracts an audio enhancement parameter corresponding to the scene that is set with the highest priority by the priority setting unit 124. The audio enhancement parameter extraction unit 125*b* extracts an audio enhancement parameter individually for each speaker 4 and determines an audio enhancement parameter to be extracted based on the priorities set by the priority setting unit 124 (based on the scene with the highest priority), in the same manner as in the vibration parameter extraction unit 125*a***.

The learning unit **125*c* learns the relationship between scenes and realism parameters stored in the parameter information DB 134. For example, the learning unit 125*c* learns the relationship between scenes and realism parameters by machine learning, using each scene stored in the parameter information DB 134** and the corresponding realism parameters, and the user's response to realistic sensation control by these parameters as training data.

In this case, for example, the learning unit **125*c* may use user evaluations of the realism parameters (user's adjustment operations after realistic sensation control, or user's inputs such as questionnaires) as training data. In other words, the learning unit 125*c*** may learn the relationship between scenes and realism parameters from the viewpoint of what kind of realism parameters are to be set and for what kind of scene in order to obtain a high user rating (that is, whether a high realistic sensation was obtained).

Furthermore, based on the training results, the learning unit **125*c*** can determine what kind of realism parameters are to be set when a new scene is input. As a specific example, for example, the realism parameters for a fireworks scene can be determined using the training results of realistic sensation control for similar situations such as explosion scene. In addition, the rules about priorities may be learned based on the presence or absence and degree of factors that may change the priorities in user's adjustment operations after realistic sensation control or in user's inputs such as questionnaires (for example, when the user's adjustment operation brings parameters to those corresponding to other scenes present at the same time, or when the questionnaire includes a response indicating that priority should be given to other scenes).

This configuration allows the information processing device 10, for example, to automatically optimize the rules about priorities and the realism parameters.

Returning to the description of FIG. 5, the output unit 126 will be described. The output unit 126 outputs the realism parameters extracted by the parameter extraction unit 125 to the speaker 4 and the vibration device 5.

Figure 16:
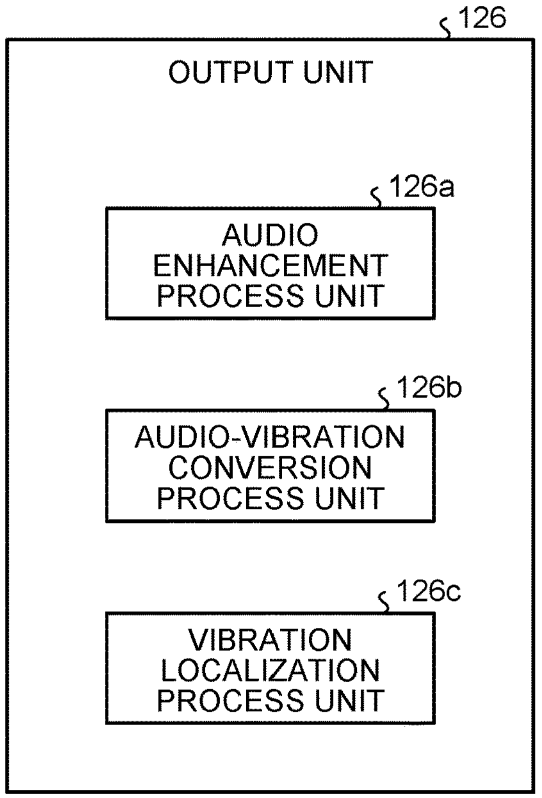
FIG. 16 is a block diagram of an output unit.

FIG. 16 is a block diagram of the output unit 126. As illustrated in FIG. 16, the output unit 126 includes an audio enhancement process unit **126*a*, an audio-vibration conversion process unit 126*b*, and a vibration localization process unit 126*c***.

The audio enhancement process unit **126*a* performs an enhancement process using the audio enhancement parameters extracted by the parameter extraction unit 125 from the audio data received from the rendering process unit 122. For example, the audio enhancement process unit 126*a*** performs an enhancement process on audio data by performing delay or band enhancement/attenuation processing based on the audio enhancement parameters.

In this case, the audio enhancement process unit **126*a* performs an audio enhancement process for each speaker 4 and outputs the audio data subjected to the audio enhancement process to each corresponding speaker 4**.

The audio-vibration conversion process unit **126*b* converts the audio data received from the rendering process unit 122** into vibration data by performing LPF or other bandwidth limiting processing suitable for vibrations.

The vibration localization process unit **126*c* performs a process related to a sense of vibration localization on vibration data obtained by conversion by the audio-vibration conversion process unit 126*b*. The vibration localization process unit 126*c* then outputs the vibration data for each vibrator that has undergone amplitude and delay processing by this process. The vibration device 5 vibrates each vibrator in accordance with the vibration data output by the vibration localization process unit 126*c***.

Figure 17:
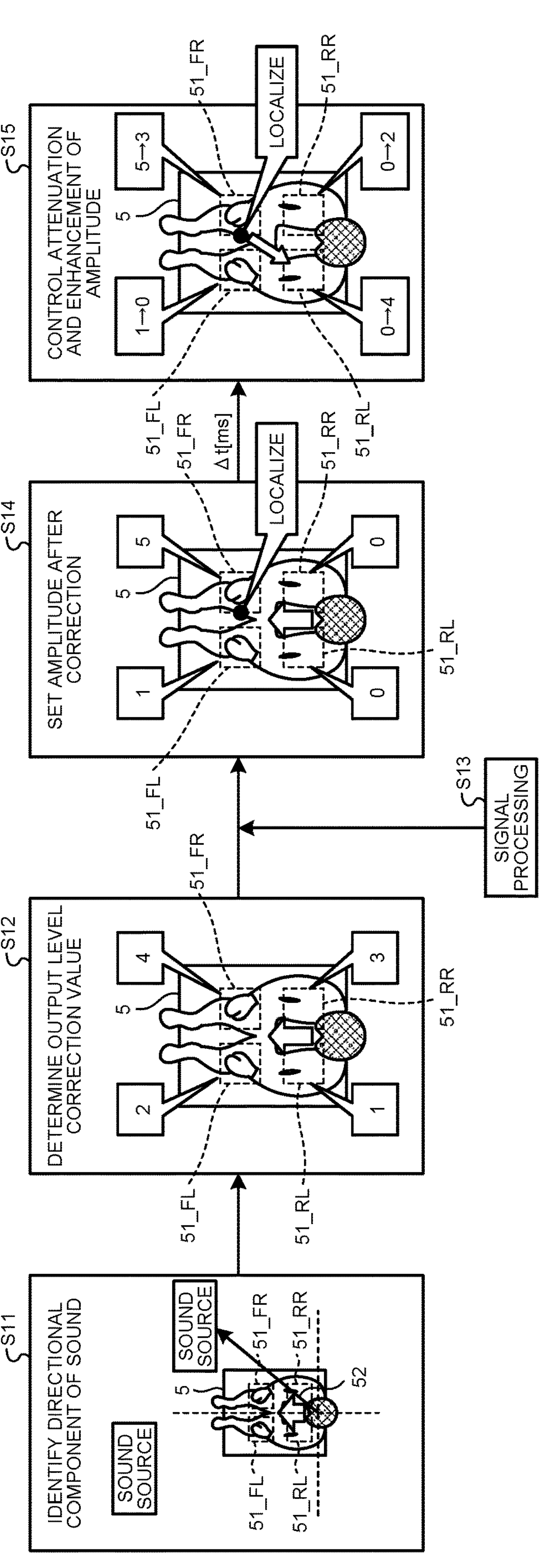
FIG. 17 is a diagram illustrating an example of a vibration localization process method.

Referring to FIG. 17, the vibration localization process method by the vibration localization process unit **126*c* will be described. FIG. 17** is a diagram illustrating an example of the vibration localization process method.

As illustrated in FIG. 17, first, the vibration localization process unit **126*c* identifies the directional component of sound to be provided to the user (content viewer) (step S11**). Specifically, since the sense of vibration localization is based on the presence position of an object that is a vibration source, the presence position (presence direction) of the object (vibration source) is estimated from the directional component of sound based on the same object, and the directional component of vibration is estimated (identified) from the estimated position and the user position (user position in the content space).

Although there may be multiple vibration sources (objects) of vibration to be provided to the user in the content, for the sake of clarity of explanation, a description will be given of a process in a case where one main vibration source (object that is expected to have the largest effect of improving a realistic sensation) is selected by the above method. Similar processes may be performed in parallel for multiple vibration sources to effectively provide the user with vibrations based on the multiple vibration sources and to replay the content with a vivid realistic sensation.

Therefore, the direction 52 of a virtual vibration source with respect to the user (a state of vibration being generated from this virtual vibration source is reproduced) is a direction indicating the direction from the user to the target that is a sound source in the XR space (virtual space), that is, the directional component of sound.

The vibration localization process unit **126*c* can identify the directional component of sound (vibration) in the same way as in the sound localization process, for example, based on the position data of the sound source (position of the target object) received from the rendering process unit 122**.

For example, the vibration localization process unit **126*c*** may identify the position of the target (sound source) based on the spectral of an audio signal of each of multiple channels included in the audio data, and identify the directional component of sound (vibration) based on the identified position.

The vibration localization process unit **126*c*** can identify the directional component of sound (vibration) based on the metadata of the content (metadata that includes data indicating the position of the target object).

In other words, the content developed using a 3D engine contains information indicating the position of an object in the virtual space, in addition to data of sound generated by the object at each time.

For example, in the case of a horse walking scene, data of the scene in the content contains horse's footsteps data and horse's position data (as metadata). The vibration localization process unit **126*c*** uses the horse position data to identify the sound source position (the position of the horse as the sound source) for the horse's footsteps.

The vibration localization process unit **126*c*** then identifies the direction from the user position in the virtual space to the sound source position of the horse's footsteps (the horse's position) as the directional component of sound and determines the identified directional component as the directional component of vibration (localization sense direction).

Alternatively, the directional component of sound may be identified by subjecting an image in the content to image recognition and thereby recognizing a sound source target object and its position, and the identified directional component of sound may be determined as the directional component of vibration (localization sense direction).

The vibration localization process unit **126*c* then determines various data for processing, such as coefficient values and correction values used for vibration control (vibration data (signal) generation process) of each vibrator 51 of the vibration device 5**.

For example, each vibrator 51 has individual differences in characteristics (the relationship between input signal and vibration output, for example, the ratio between input signal level and vibration output level), and correction data for correcting the differences in characteristics is determined. Specifically, in the present embodiment, since the output vibration level has a large effect, vibrator characteristic data is determined based on the ratio (in amplitude) between the input signal level and the vibration output level (hereinafter referred to as vibrator sensitivity).

Data of the vibrator sensitivity can be calculated by measuring a vibration amplitude when a test vibration signal is applied to the vibrator, and by using the test vibration signal amplitude and the vibration amplitude, and the calculated data is stored in the storage unit 130 (vibrator information DB 135) and utilized.

The vibration localization process unit **126*c*** also determines sensitivity characteristic correction data for correcting a difference in sensitivity characteristics, which are characteristics of sensation that the user experiences in response to vibration, and sensitivity characteristic correction data for correcting a difference in characteristics of vibration transmission to the user due to the contact state between the user and each vibrator.

One of the sensitivity characteristic correction data is data for correcting the difference in how vibrations are felt due to the individual differences of the user or due to the difference in body parts. The vibration localization process unit **126*c*** determines the sensitivity characteristic that is the intensity characteristic of a vibration feeling, as the sensitivity characteristic correction data.

The sensitivity characteristics can be determined, for example, by input operations by the user prior to content viewing. Specifically, the sensitivity characteristics can be measured, for example, by providing the user with vibrations with a predetermined intensity from each vibrator, and allowing the user to input his/her sensation to the vibrations.

The other sensitivity characteristic correction data is data for correcting the difference in how vibrations are felt due to the contact state between the user and each vibrator 51, and in the present embodiment, it is the pressure received by each vibrator when the user is seated and which has a large effect on the intensity characteristic of a vibration feeling, that is, pressure distribution data on the seating surface when the user is seated. The vibration localization process unit **126*c* determines the pressure value at a section where each vibrator 51** is installed in the seating surface, as the sensitivity characteristic correction data.

The pressure value can be measured by installing a pressure sensor on the seat surface of the seat on which the user is seated during content viewing.

Alternatively, the sensitivity characteristic correction data may be determined as a combination of the sensitivity characteristics and the pressure value, for example, by providing the user with vibrations with a predetermined intensity from each vibrator and allowing the user to input his/her sensation to the vibrations.

Since the sensitivity characteristic correction data is correction data according to the user's characteristics and state (user seated state), the ratio between vibration level (level of vibrations when a vibration signal is input to a vibrator determined as having standard characteristics) and user sensation (vibration level) is hereinafter referred to as user sensitivity. This user sensitivity is then stored in the storage unit 130 (vibrator information DB 135) and utilized during content replay.

The vibration localization process unit **126*c* then calculates an output level correction value for each vibrator using the vibrator sensitivity and the user sensitivity, and stores the calculated output level correction value into the storage unit 130 (vibrator information DB 135). Specifically, the vibration localization process unit 126***c* stores the reciprocal value of the sum of the vibrator sensitivity and the user sensitivity as the output level correction value in the storage unit 130 (vibrator information DB 135). In other words, each vibrator vibrates based on vibration data, and vibration perception characteristic indicating how the user feels the vibration (what vibration level) (the relationship between the vibration data and the user's perception of vibration intensity, in which case the characteristic elements (characteristics) of the vibrator are also taken into consideration) is stored as the output level correction value in the storage unit 130. Since the vibrator sensitivity is the ratio between vibration signal level and vibration level (amplitude) and the user sensitivity is the ratio between vibration level (amplitude) and user sensation, if a vibration signal of the same vibration signal level is input to each vibrator after correction processing (division) with the output level correction value corresponding to each vibrator, the user feels the same level of vibration from each vibrator. In the example illustrated at S12 in FIG. 17, an output level correction value 61A at each vibrator is calculated as 2 for the vibrator 51FL, 4 for the vibrator 51FR, 1 for the vibrator 51RL, and 3 for the vibrator 51RR.

Figure 18:
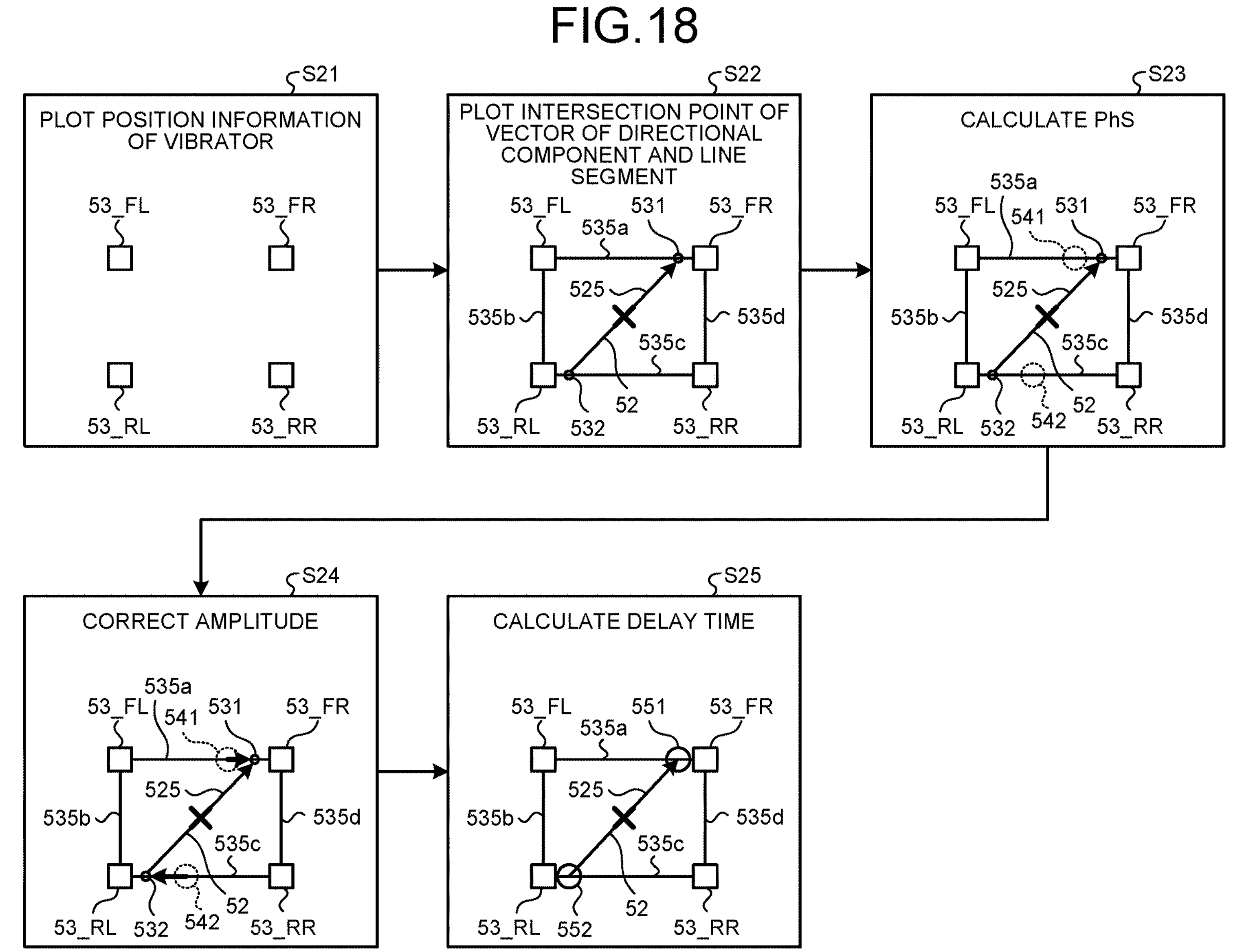
FIG. 18 is a diagram illustrating an example of a signal processing method.

The vibration localization process unit 126*c* then performs signal processing (step S13). Referring to FIG. 18, the signal processing will be described. FIG. 18 is a diagram illustrating the principle idea of the signal processing method in the present embodiment. This processing method is implemented by the control unit 120 (CPU) executing arithmetic formulas and processing programs based on the principle. For the sake of clarity of explanation, this is an example of the processing in a two-dimensional horizontal space in a content replay space (where the processing ignores the height direction). Since most content is widely distributed on the plane (ground) of a vibration target and the direction of movement is also mostly on the plane (ground), the processing in a two-dimensional horizontal space is sufficient for approximation.

As illustrated in FIG. 18, first, the vibration localization process unit 126*c* plots the position of each vibrator in the coordinate space for calculation (step S21). In other words, the vibration localization process unit 126*c* plots points in accordance with the position coordinate data of the vibrators (point 53_FL, point 53_RL, point 53_FR, point 53_RR) acquired from the vibrator information DB 135.

The vibration localization process unit 126*c* then calculates the centroid of the plotted position coordinate points of the vibrators (average coordinates of the X and Y coordinate values of the points). The vibration localization process unit 126*c* draws lines 535*a*, 535*b*, 535*c*, and 535*d* (non-diagonal lines) that connect the position coordinate points of the vibrators and form the perimeter of a polygon (quadrangle). Furthermore, the vibration localization process unit 126*c* draws a line 525 that passes through the centroid and extends in the direction 52 determined at step S11 in FIG. 17.

The vibration localization process unit 126*c* then plots the intersection points (points 531 and 532) of the line 525 and the lines 535*a* and 535*c* (step S22).

Of the line segments whose intersections are plotted at step S22, the line segment (line 535*a*) passing through the point 531 on the side of the direction 52 is called no delay-side line segment (535*a*). The end points (points 53_FL and 53_FR) of the no delay-side line segment 535*a* are called no delay-side points (53_FL and 53_FR).

Of the line segments whose intersections are plotted at step S22, the line segment (line 535*c*) passing through the point 532 on the opposite side of the direction 52 is called delay-side line segment (535*c*). The end points of the delay-side line segment 535*c* (points 53_RL and 53_RR) are called delay-side points (53_RL and 53_RR).

The figure composed of lines connecting the position coordinate points of the vibrators (lines forming the outer perimeter) is not necessary a quadrangle and may be a polygon other than quadrangle or polyhedron. In other words, the figure is a polygon according to the number of vibrators to be controlled (for example, a pentagon if there are five vibrators to be controlled). Then, of the sides of the polygon that intersect with the line 525 passing through the centroid of the polygon and extending in the direction 52 determined at step S11 of FIG. 17, the side of the direction 52 is the no delay-side line segment, and the side of the direction opposite to the direction 52 is the delay-side line segment. The end points of the no delay-side line segment are the no delay-side points, and the end points of the delay-side line segment are the delay-side points.

When the no delay-side line segment and the delay-side line segment are selected from the sides of the polygon that intersect with the line 525 passing through the centroid of the polygon and extending in the direction 52 determined at step S11 of FIG. 17, the selected line segments are not adjacent to each other. As described below, this process prevents one vibrator from undergoing both of vibration control for no delay-side vibrators and vibration control for delay-side vibrators, thereby simplifying the computation for control. In addition, this process also prevents one vibrator from serving to perform the operations of two vibrators, thereby increasing control accuracy. In addition, since the centroid has the same relationship with each side of the polygon, the same processing is applied to vibration sources in any direction. As a result, the creation of a processing program is expected to become easy.

Subsequently, the vibration localization process unit 126*c* performs a process related to control of vibration perception positions based on the technical concept of phantom sensation (Phs). Phantom sensation is defined as follows: "when the same stimulus (for example, vibration) is applied to two points at the same time, a feeling of being stimulated at the middle of the two points is felt. When the magnitudes (for example, amplitudes in the case of vibration) of the stimulus are different, the point at which the feeling of being stimulated is felt (hereafter referred to as the stimulus perception point) moves toward the point given the larger stimulus." The position of the stimulus perception point is assumed by approximation such that the distance ratio from each stimulus point is inversely proportional to the stimulus intensity ratio (in the case of vibration, amplitude) at each stimulus point. In the present embodiment, the vibration stimulus to the user is controlled based on this idea.

Furthermore, the vibration localization process unit 126*c* performs a process related to control of a sense of vibration direction based on the technical concept of tactile apparent motion. Tactile apparent motion is "creating a sense of movement in vibration by providing a time difference between vibrations at two points."

In other words, the vibration localization process unit 126*c* performs a process of generating vibrations that give the user a sense of localization with a vivid realistic sensation based on the concepts of phantom sensation and tactile apparent motion.

Specifically, the points 531 and 532 illustrated at step S22 in FIG. 18 are used as vibration perception positions, and a time difference in vibration time between points 531 and 532 is provided, so that the user has a sense of movement of vibration between the points 531 and 532. In other words, the user feels localized vibrations that move in the direction of the line connecting the points 531 and 532, that is, toward the vibration source (the vibration generating object in the content) position.

First, the process based on the technical concept of phantom sensation will be explained in detail using a specific example.

The vibration localization process unit 126*c* performs a process based on the points 531 and 532 as the stimulus perception points. Based on the technical concept of phantom sensation, when the ratio between the distance from the point 531 to the vibrator position 53_FL (L1) and the distance from the point 531 to the vibrator position 53_FR (L2) is the reciprocal of the ratio between the amplitude generated by the vibrator 51_FL and the amplitude generated by the vibrator 51_FR, the stimulus perception point is the point 531. Thus, the vibration localization process unit 126*c* calculates L2/(L1+L2) as a correction value 60AFL (correction value to be summed to the vibration signal) for the vibrator 51_FL. The vibration localization process unit 126*c* also calculates L1/(L1+L2) as a correction value 60AFR for the vibrator 51_FR.

The vibration localization process unit 126*c* then performs the same processing for the process based on the point 532 as a stimulus perception point to calculate L4/(L3+L4) as a correction value 60ARL for the vibrator 51_RL. The vibration localization process unit 126*c* also performs the same processing for the stimulus perception point 532 to calculate L3/(L3+L4) as a correction value 60ARR for the vibrator 51_RR. L3 is the distance from the point 532 to the vibrator position 53_RL, and L4 is the distance from the point 532 to the vibrator position 53_RR.

A vibration signal is generated by summing the correction value 60AFL to vibration data VD generated by the method described above and then output to the vibrator 51_FL, and a vibration signal is generated by summing the correction value 60AFR to vibration data BD and then output to the vibrator 51_FR, so that the user's stimulus perception point is at the point 531. Similarly, a vibration signal is generated by summing the correction value 60ARL to the vibration data VD and then output to the vibrator 51_RL, and a vibration signal is generated by summing the correction value 60ARR to vibration data BD and then output to the vibrator 51_RR, so that the user's stimulus perception point is at the point 532.

For example, when the distances L1, L2, L3, and L4 are 3k, 2k, 2k, and 3k, respectively, the correction value 60AFL for the vibrator 51_FL is 3k/(3k+2k)=0.6, and the correction value 60AFR for the vibrator 51_FR is 2k/(3k+2k)=0.4.

The correction value 60AFL for the vibrator 51_RL is 2k/(3k+2k)=0.4, and the correction value 60AFR for the vibrator 51_RR is 3k/(3k+2k)=0.6.

In actuality, however, individual differences in vibrators, user sensitivity, and the seated state on the vibrating seat cause an error in the intensity of vibration felt by the user, resulting in the user's stimulus perception points at points 541 and 542.

The vibration localization process unit 126*c* then corrects the vibration signal for each vibrator, using the output level correction value (61AFL, 61AFR, 61ARL, 61ARR) for each vibrator (51_FL, 51_FR, 51_RL, 51_RR) calculated in advance by the process described with reference to FIG. 17.

Specifically, the vibration localization process unit 126*c* sets the sum of the vibration data VD, the correction value 60ARL, and the correction value 61AFL as vibration data for the vibrator 51_FL, and outputs a vibration signal to the vibrator 51_FL. Similarly, the vibration localization process unit 126*c* sets the sum of the vibration data VD, the correction value 60AFR, and the correction value 61AFR as vibration data for the vibrator 51_FR, and outputs a vibration signal to the vibrator 51_FR. The vibration localization process unit 126*c* sets the sum of the vibration data VD, the correction value 60ARL, and the correction value 61ARL as vibration data for the vibrator 51_RL, and outputs a vibration signal to the vibrator 51_RL. The vibration localization process unit 126*c* sets the sum of the vibration data VD, the correction value 60ARR, and the correction value 61ARR as vibration data for the vibrator 51_RR, and outputs a vibration signal to the vibrator 51_RR.

For example, when the correction values 61AFR, 61AFL, 61ARL, and 61ARR are 2, 4, 1, and 3 as depicted at step S12 in FIG. 17, and the distances L1, L2, L3, and L4 are 3k, 2k, 2k, and 3k, respectively, vibration data 53DFL, 53DFR, 53DRL, and 53DRR of the vibration signals output to the vibrators 51_FL, 51_FR, 51_RL, and 51_RR are as follows, where the original vibration data is VD, and the vibration signals based on these vibration data 53D are output to the corresponding vibrators 51.

$$53DFL = VD \cdot 3\,k/(3\,k + 2\,k)/2 = 0.3 \cdot VD$$

$$53DFR = VD \cdot 2\,k/(3\,k + 2\,k)/4 = 0.1 \cdot VD$$

$$53DRL = VD \cdot 2\,k/(2\,k + 3\,k)/1 = 0.4 \cdot VD$$

$$53DRR = VD \cdot 3\,k/(2\,k + 3\,k)/3 = 0.2 \cdot VD$$

As a result, the error caused by individual differences in vibrators and user sensitivity is corrected, and the user's stimulus perception point moves from the positions at the points 541 and 542 to the target positions at the points 531 and 532, as illustrated at step S24 in FIG. 18.

In this way, the vibration localization process unit 126*c* controls the amplitude and delay of the output vibration of each vibrator, based on the arrangement of the vibrators.

This configuration allows the amplitude to be controlled according to the actual arrangement of the vibrators and enables the user to feel a more natural sense of vibration localization.

The vibration localization process unit 126*c* controls the amplitude and delay of the output vibration of each vibrator, based on the user's vibration perception characteristic for the output vibration from each vibrator.

For example, the information processing device 10 stores the sensitivity characteristic for each part of the user's body in advance. The vibration localization process unit 126*c* then uses different sensitivity characteristics depending on whether the site in intimate contact with each vibrator is the left or right side of the user's body, or the thigh or buttocks.

In this way, the amplitude can be controlled according to the actual user's vibration perception characteristic, that is, the amplitude can be controlled in consideration of the relationship between the vibration signal and the vibration sensation felt by the user. Accordingly, how the user feels vibration can be brought closer to what is intended in the design.

The vibration perception characteristic is the characteristic in consideration of individual differences for each vibrator and individual differences for each user.

For example, the vibration perception characteristic is estimated based on the relationship between input signal and output vibration level of each vibrator, the user's weight, physical condition, or posture, and the like. The vibration localization process unit 126*c* uses the vibration perception characteristic to control the amplitude of each vibrator.

This configuration can provide vibrations in consideration of individual differences for each vibrator and individual differences for each user.

It may be difficult to set the user's posture state during content viewing through user input or the like. The vibration localization process unit 126*c* then vibrates the vibrator for calibration in the user's posture state during content viewing to measure the vibration perception characteristic of the user.

For example, the information processing device 10 instructs the user to take a viewing posture, and thereafter allows the user to actually view sample content (for calibration of vibration perception characteristic for the user's posture) and allows the vibrator to produce vibration for calibration. The information processing device 10 then estimates a vibration perception characteristic correction value related to the user's viewing posture, based on the user's feedback or biometric information. The information processing device 10 then stores the determined vibration perception characteristic correction value and uses it for the subsequent process of calculating the vibration perception characteristic.

This configuration can provide vibrations finely adapted to the posture state of each user during content viewing.

Furthermore, the vibration localization process unit 126*c* corrects the amplitudes of all vibrators according to the scene, based on the amplitude enhancement factor acquired from the parameter information DB 134.

The process based on the technical concept of tactile apparent motion will now be explained in detail using a specific example.

The vibration localization process unit 126*c* calculates the delay time of the vibrators corresponding to the delay-side points, in the present example, the vibrators 51_RL and 51_RR (Δt: delay time from the vibration timing of the vibrators 51_FL and 51_FR corresponding to the no delay-side points) (step S25). The delay time from the vibration generation (sound generation from the same target object) timing in the content of the vibrators 51_FL and 51_FR corresponding to the no delay-side points is set to 0. However, in some scenes of content, it may be effective to delay or accelerate the vibration generation timing of the vibrators 51_FL and 51_FR corresponding to the no delay-side points.

Although a realistic sensation can be improved even with the delay time of a predetermined fixed time, it may be more effective to calculate the delay time, for example, using the following formula.

$$\text{Delay time } \Delta ti = ai \cdot yi \cdot Y \text{ (} i \text{ is each timing)}$$

Here, ai is a value representing whether to delay, and ai is set to 1 when the delay processing is required and to 0 when it is not required. Further, yi is a vibration enhancement factor, which is a value used to adequately enhance the vibration generated by a vibration generation target object in a target scene of content. For example, in a scene where vibration is to be strongly enhanced, the enhancement factor ai is a large value, and the delay time is also increased according to the degree of enhancement to make the difference more perceptible. In principle, Y is a value of the time required for vibration to travel the distance between the points 531 and 532 as the stimulus perception points. It is advantageous to use an appropriate constant to reduce the processing load. The constant for Y may be an intermediate value of the distance between the points 531 and 532 (the average of the distance between the vibrator positions 53_FL and 53_RL and the distance between the vibrator positions 53_FR and 53_RL), or a value determined to be appropriate by sensitivity testing or the like.

The value ai indicating whether to delay and the enhancement factor yi are values determined according to the state of the vibration generation target object in the target scene of content, and are determined based on, for example, the image analysis results of content images, the content sound (particularly sound generated by the vibration generation target object) analysis results, or additional information of the content (added to the content in advance as control data).

The vibration localization process unit 126*c* calculates the delay time Δti in each scene using this formula, and outputs a corresponding vibration signal at each timing based on the calculated delay time Δti to each vibrator 51 to allow the vibrator 51 to vibrate (step S25).

For example, when the calculated delay time Δti is one second in the vibration data example above, each vibrator vibrates as follows.

Vibrator 51_FL: vibration data 0.3·VD, vibration timing 0 seconds (delay time from the replay timing of the target scene in the content, the same applies to the following vibrators)

Vibrator 51_FR: vibration data 0.1·VD, vibration timing 0 seconds

Vibrator 51_RL: vibration data 0.4·VD, vibration timing 1 second

Vibrator 51_RR: vibration data 0.2·VD, vibration timing 1 second

As a result, the user feels the vibration at the point 531 at the replay timing of the target scene in the content and feels the vibration at the point 532 one second later, thus feeling vibration along the direction from the vibration source. Thus, the user can properly feel a sense of localization of the vibration source (vibration generating object) and enjoy content replay with a vivid realistic sensation.

A modification to the delayed drive for the vibrators 51 will now be described. In the process example above, the vibration localization process unit 126*c* (output unit 126) performs such a process that moves vibration discontinuously from a vibrator corresponding to the no delay-side point to a vibrator corresponding to the delay-side point, whereas the present example allows the user to feel such a sensation that the vibration position gradually moves. This process is also based on the technical concept of phantom sensation.

Specifically, the vibration localization process unit 126*c* attenuates the amplitudes of the vibrators 51_FL and 51_FR corresponding to the no delay-side points over a delay time Δt. On the other hand, the vibration localization process unit 126*c* increases the amplitudes of the vibrators 51_RL and 51_RR corresponding to the delay-side points over a delay time Δt.

For example, when the delay time Δti is one second in the vibration data example above, each vibrator vibrates based on the following vibration data after T seconds (T is the delay time Δti (one second) or shorter) from the replay timing of the target scene in the content.

Vibrator 51_FL: vibration data 0.3·VD·((1−T)/1)

Vibrator 51_FR: vibration data 0.1·VD·((1−T)/1)

Vibrator 51_RL: vibration data 0.4·VD·(T/1)

Vibrator 51_RR: vibration data 0.2·VD·(T/1)

It is also effective to set final attenuation values for the vibrators 51_FL and 51_FR corresponding to the no delay-side points to a moderately weak sound level instead of a silent level, or to set the final attenuation values before the elapse of the delay time Δt from the replay timing of the target scene in the content. It is also effective to start amplitude increase for the vibrators 51_RL and 51_RR corresponding to the delay-side points from a moderately weak level instead of a silent level, or to set attenuation start values after the elapse of a predetermined time (delay time Δt or shorter) from the replay timing of the target scene in the content.

In this way, the present embodiment allows the content viewing user to feel a sense of vibration source position and a sense of vibration movement properly based on the details of the content, based on the technical concepts of phantom sensation and tactile apparent motion, so that the user can enjoy replay of the content with a vivid realistic sensation.

These operations can be conceptualized as follows: "the amplitude of output vibration of each vibrator is controlled such that the positional relationship (line connecting the points 551 and 552) between a first composite vibration position (point 551) determined based on the vibration level of each vibrator in a first vibrator group of a plurality of vibrators (vibrators 51_FL and 51_FR) and a second composite vibration position (point 552) determined based on the vibration level of each vibrator in a second vibrator group of a plurality of vibrators (vibrators 51_RL and 51_RR) agrees with a directional component (direction 52) of the identified vibration source; and a delay of output vibration of each vibrator (the vibration timing of the vibrators 51_FL and 51_FR (delay 0 from vibration occurrence in the content) and the vibration timing of the vibrators 51_RL and 51_RR (for example, delay Δt from vibration occurrence in the content)) is controlled according to the directional component of the vibration source."

Figure 19:
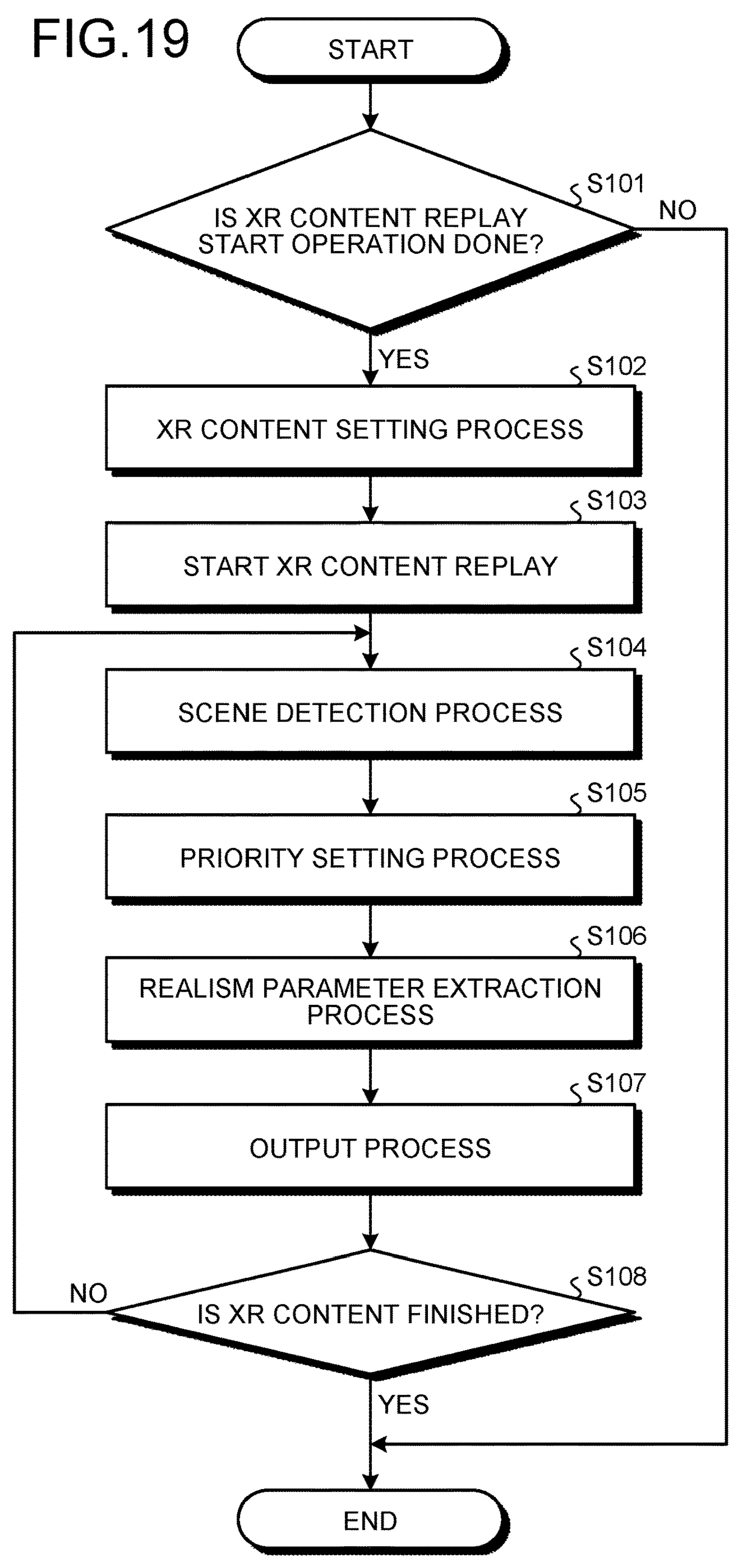
FIG. 19 is a flowchart illustrating a process procedure executed by the information processing device.

Referring now to FIG. 19, a process procedure executed by the information processing device 10 according to embodiments will be described. FIG. 19 is a flowchart illustrating a process procedure executed by the information processing device 10. The process procedure described below is repeatedly executed by the control unit 120.

The process in the flowchart illustrated in FIG. 19 is repeatedly executed in the power-on state of the information processing system 1. Upon start of the process, it is determined whether an XR content replay start operation is done, and if the start operation is detected (Yes at step S101), the process moves to step S102, and if not, the process ends (No at step S101).

An XR content setting process is first executed (step S102). The XR content setting process here includes, for example, various processes related to initial settings of devices for XR content replay and selection of XR content by the user.

Subsequently, the information processing device 10 starts replay of XR content (step S103) and performs a scene detection process for the XR content being replayed (step S104). Subsequently, the information processing device 10 performs a priority setting process for the result of the scene detection process (step S105) and executes a realism parameter extraction process (step S106).

The information processing device 10 then executes an output process for various vibration data or audio data that reflects the process result of the realism parameter extraction process (step S107). The information processing device 10 then determines whether the XR content is finished (step S108), and if it is determined that the XR content is finished (Yes at step S108), the process ends.

If the information processing device 10 determines that the XR content has not been finished in the determination at step S108 (No at step S108), the process moves to step S104 again.

Figure 20:
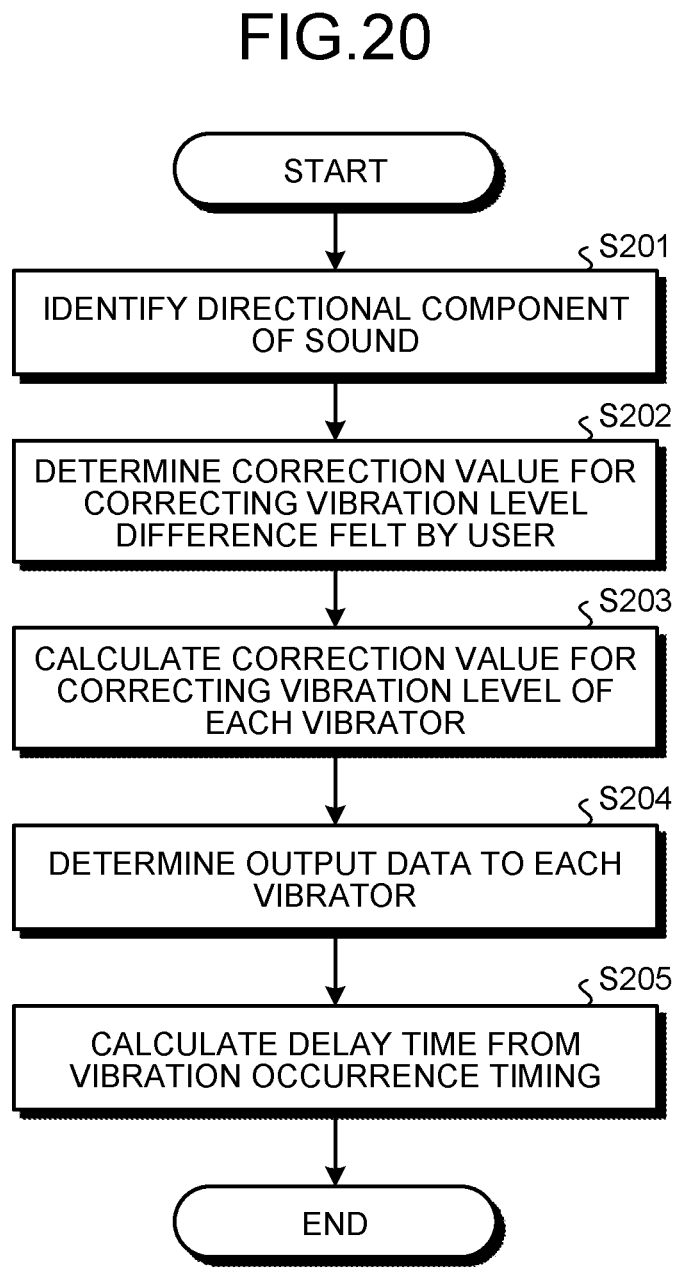

Referring to FIG. 20, the procedure of the vibration localization process will be described. FIG. 20 is a flowchart illustrating a procedure of the vibration localization process. The vibration localization process corresponds to the process executed by the vibration localization process unit 126*c* (control unit 120). This process is also a part of the processes at step S106 and step S107 in the process illustrated in FIG. 19. The specific process details of each step are as described above.

First, as illustrated in FIG. 20, the vibration localization process unit 126*c* identifies the directional component of sound (vibration) (step S201).

The vibration localization process unit 126*c* then determines a correction value CI for correcting a vibration level difference felt by the user due to individual differences for each vibrator, individual differences of the user, and the user's content viewing state (step S202). The correction value CI is determined and stored in advance before replay of the content (for example, when the user is seated), and the stored correction value CI is read at step S202.

Subsequently, the vibration localization process unit 126*c* calculates a correction value FS for correcting the vibration level of each vibrator, using the directional component of sound determined at step S201 and the installation position information of each vibrator, based on the technical concept of phantom sensation (step S203).

The vibration localization process unit 126*c* then determines a correction value CV for correcting vibration data for each vibrator, from (the sum of) the correction value CI for correcting the effects of individual differences in vibrators and the like determined at step S202 and the correction value FS based on the technical concept of phantom sensation calculated at step S203. Vibration data separately determined based on the content is then subjected to correction (summing) with the determined correction value CV for vibration of each vibrator to determine output data to each vibrator (step S204).

The vibration localization process unit 126*c* then calculates the vibration timing of each vibrator (vibration signal output timing to each vibrator), based on the technical concept of tactile apparent motion. In other words, the delay time from the vibration generation timing (in the present embodiment, audio generation timing as the vibration signal is generated based on an audio signal) of the vibration generating object in the content scene is calculated (step S205).

The vibration localization process unit 126*c* then provides the vibration data for each vibrator and the vibration timing data as output data, and the output unit 126 outputs an output signal to each vibrator (step S107 in FIG. 19).

As described above, the vibration localization process unit 126*c* in the information processing device 10 according to embodiments has a plurality of vibrators, identifies the directional component of a vibration source in the input content, and controls the amplitude and delay of output vibration of each vibrator, based on the directional component.

With such control, the information processing device 10 can provide the user with a sense of sound source localization (a sense of position) and a sensation of vibration transmission (a sense of vibration movement) by adjusting the amplitude and delay of the output vibrations of the multiple vibrators. In other words, the information processing device 10 gives the user a sense of sound source localization based on the relationship between the amplitudes of output vibrations of the vibrators, and gives the user a sense of vibration movement based on the difference in timing of output vibrations of the vibrators. As a result, the information processing device 10 can provide the user with a sensation of vibrations in the content with a vivid realistic sensation.

Second Embodiment

A second embodiment simplifies the process of calculating the correction value based on the technical concept of phantom sensation so that, for example, a relatively slow arithmetic processing unit (for example, CPU) can handle the process.

In summary, the directional component of sound (vibration) is identified in an appropriate number of area units (in this example, identified in eight angle areas, that is, eight stages), and the subsequent calculation of the correction value is performed by model processing for each angle area, for example, by using a data table in which control values for each angle area are stored, or by using a computation routine designed for each angle area. This implementation simplifies the process and reduces the processing load on the arithmetic processing unit.

Figure 22:
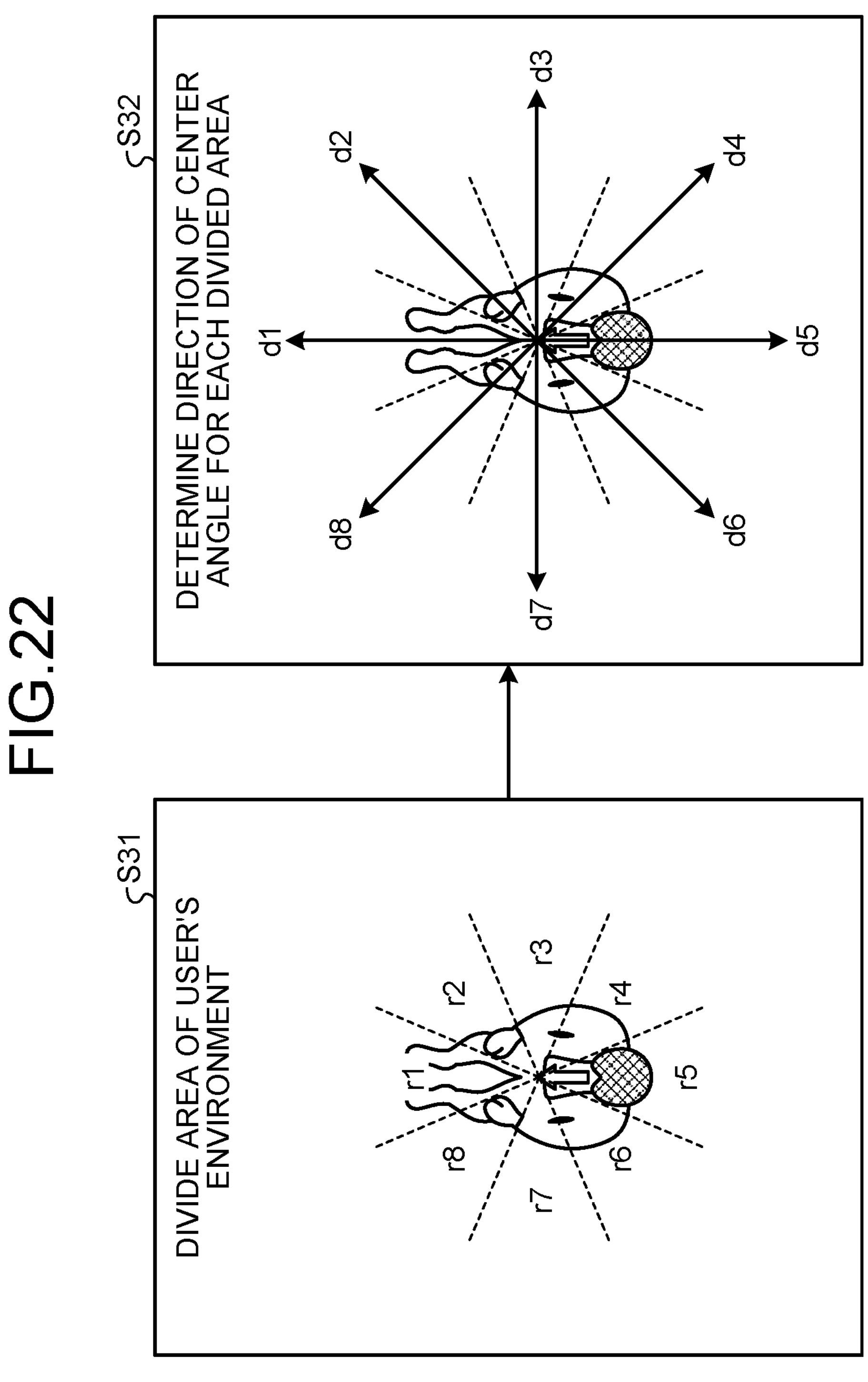
FIG. 22 is a diagram illustrating an example of a vibration control method.

Referring to FIG. 22, a method for setting the amplitude and the delay time in advance will be described. FIG. 22 is a diagram illustrating a method of determining the directional component of vibration.

The vibration localization process unit 126*c* (control unit 120) determines which of angle areas r1 to r8 the directional component of vibration in the content (in the present embodiment, estimated from sound in the content) belongs to, where the angle areas r1 to r8 are eight divided parts of the user's environment (step S31). Data that defines the angle areas is stored in advance (for example, at the time of design) in the storage unit 130, and the angle area for the directional component of vibration is determined using the stored data. In the present embodiment, as depicted at step S31, the angle areas r1 to r8 are set every 45 degrees, with the angle area r1 at frontal 45 degrees as a reference.

The vibration localization process unit 126*c* then determines the direction (d1 to d8: referred to as representative direction) that is the center of the angle area to which the directional component of vibration is determined to belong, as vibration directional data to be used for calculating the correction value based on the technical concept of phantom sensation. This process can be implemented by storing a data table representing the relationship between the angle areas r1 to r8 and representative directions d1 to d8 in the storage unit 130 in advance, and performing matching using the data in the data table.

For example, when the front of the content viewing user is 0° and the clockwise angle is denoted by a positive value, the area r1 is the area from −30° to 30° and its representative direction d1 is the direction of 0°. The area r2 is the area from 30° to 60° and the direction d1 is the direction of 45°. For example, when the directional component of vibration is 45°, the vibration localization process unit 126*c* determines that the representative direction is d2, and the representative direction d2 is used in the subsequent process.

The information processing device 10 then performs signal processing similar to the method illustrated in FIG. 17, using the representative direction data of the directional component of vibration determined by the above method. In this case, there are only eight representative directions d, and in the present embodiment, correction values based on the technical concept of phantom sensation are calculated in advance for these eight representative directions d1 to d8, and stored in the form of a data table in the storage unit 130.

In addition, correction values based on the technical concept of tactile apparent motion are also calculated in advance, and the integrated correction values (for example, the sum of correction values for a vibration level) are calculated based on the calculated correction values and the correction values based on the technical concept of phantom sensation determined as described above, and stored in the storage unit 130 in the form of a data table. In this case, the data table of correction values based on the technical concept of phantom sensation can be omitted.

Instead of calculating the integrated correction values, another possible method is to calculate correction values based on the technical concept of phantom sensation using a data table, calculate correction values based on the technical concept of tactile apparent motion without using a data table, and correct vibration data with each of the correction values.

FIG. 21 is a data table configuration diagram illustrating an example of a data table of correction values based on the technical concept of phantom sensation and the technical concept of tactile apparent motion.

The data table stores correction values for vibration amplitude and correction values for vibration timing (delay) that are calculated in advance (for example, at the time of design) for each vibrator (51FL, 51FR, 51RL, 51RR) and for each representative direction (d1 to d8).

The vibration localization process unit 126*c* then extracts, from the data table, the correction values for amplitude and delay corresponding to the determined representative direction d, for each vibrator 51, and corrects the vibration data.

For example, when the representative direction is direction d2, the amplitude correction value for the vibrator 51FL is −2 db and the delay time is 0 ms, the amplitude correction value for the vibrator 51FR is +4 db and the delay time is 0 ms, the amplitude correction value for the vibrator 51RL is +4 db and the delay time is 50 ms, and the amplitude correction value for the vibrator 51RR is −4 db and the delay time is 50 ms. The vibration data is then corrected with these correction values, and the corresponding vibration signal is output to each vibrator 51.

The data table illustrated in FIG. 21 excludes factors that are variable with the content viewing situations, such as user sensitivity and seat seated state (pressure distribution on the seat surface) as factors for correction, or excludes seat types (for example, vibrators themselves or arrangement thereof) as factors for correction. However, these variable factors may be added as parameters to the data table to enable control adapted to these variable factors.

In this way, in the second embodiment, the information processing device 10 determines which of a plurality of predetermined angle areas the directional component of vibration belongs to, selects a model corresponding to the determined angle area of the directional component (a data set for the corresponding direction in the data table in FIG. 21) from the models (data table in FIG. 21) preset individually for the angle areas, and controls the amplitude and delay of output vibration of each vibrator based on the selected model.

Specifically, the model has a data table (data table in FIG. 21) in which amplitude correction values for amplitude and delay correction values for delay are stored for each of a plurality of angle areas. The information processing device 10 controls the amplitude and delay of output vibration of each vibrator, based on the amplitude correction value and the delay correction value for each vibrator that are stored in the data table corresponding to the angle area of the directional component.

The second embodiment therefore can perform control through the process using a model (data table) created in advance corresponding to the angle area to which the directional component of vibration belongs, rather than performing a complicated process using the directional component of vibration, thereby reducing the processing load, such as reducing the calculation volume.

In the description of the foregoing embodiments, the content is XR content, but embodiments are not limited to this. Specifically, the content may be 2D video and audio, or video only, or audio only.

Additional effects and modifications can be easily derived by those skilled in the art. The broader aspects of the present invention therefore are not limited to the specific details and representative embodiments expressed and described above. Thus, various changes can be made without departing from the spirit or scope of the general inventive concepts as defined by the appended claims and equivalents thereof.

The invention claimed is:

1. An information processing device for controlling a plurality of vibrators,
comprising a controller, wherein
the controller
controls an amplitude and a delay of output vibration of each of the vibrators according to an angular region in which a target of a vibration source is positioned,
identifies a directional component of an object constituting the vibration source in input content,
determines which of a plurality of predetermined angle areas the directional component belongs to,
selects a model corresponding to the determined angle area of the directional component from models preset individually for the angle areas, and
controls the amplitude and the delay of output vibration of each of the vibrators based on the selected model.

2. The information processing device according to claim 1, wherein
the model has a data table in which an amplitude correction value for amplitude and a delay correction value for delay are stored for each of the angle areas, and
the controller controls the amplitude and the delay of output vibration of each of the vibrators, based on the amplitude correction value and the delay correction value stored in the data table corresponding to the angle area of the directional component.

3. The information processing device according to claim 1, wherein the controller controls the amplitude and the delay of output vibration of each of the vibrators, based on a user's vibration perception characteristic for the output vibration of each of the vibrators.

4. The information processing device according to claim 3, wherein the controller calculates the user's vibration perception characteristic for the output vibration of each of the vibrators, based on characteristics of the vibrator and a user's state.

5. The information processing device according to claim 3, wherein the controller measures the user's vibration perception characteristic for the output vibration of each of the vibrators by vibrating the vibrator for calibration in a user's posture state during content viewing.

6. The information processing device according to claim 1, wherein
the controller
controls the amplitude of output vibration of each of the vibrators such that a relationship between a first composite vibration position determined based on a vibration level of each vibrator in a first vibrator group of the plurality of vibrators and a second composite vibration position determined based on a vibration level of each vibrator in a second vibrator group of the plurality of vibrators agrees with the identified directional component, and
controls the delay of output vibration of each of the vibrators according to the directional component.

7. A non-transitory computer-readable recording medium storing therein an information processing program that causes a computer to execute a process comprising:
controlling an amplitude and a delay of output vibration of each of a plurality of vibrators according to an angular region in which a target of a vibration source is positioned,
identifying a directional component of an object constituting the vibration source in input content,
determining which of a plurality of predetermined angle areas the directional component belongs to,
selecting a model corresponding to the determined angle area of the directional component from models preset individually for the angle areas, and
controlling an amplitude and a delay of output vibration of each of the vibrators, based on the selected model.

8. The recording medium according to claim 7, wherein
the model has a data table in which an amplitude correction value for amplitude and a delay correction value for delay are stored for each of the angle areas, and
the controlling controls the amplitude and the delay of output vibration of each of the vibrators, based on the amplitude correction value and the delay correction value stored in the data table corresponding to the angle area of the directional component.

9. The recording medium according to claim 7, wherein the controlling controls the amplitude and the delay of output vibration of each of the vibrators, based on a user's vibration perception characteristic for the output vibration of each of the vibrators.

10. The recording medium according to claim 9, wherein the process further comprises:
calculating the user's vibration perception characteristic for the output vibration of each of the vibrators, based on characteristics of the vibrator and a user's state.

11. The recording medium according to claim 9, wherein the process further comprises:
measuring the user's vibration perception characteristic for the output vibration of each of the vibrators by vibrating the vibrator for calibration in a user's posture state during content viewing.

12. The recording medium according to claim 7, wherein the controlling
controls the amplitude of output vibration of each of the vibrators such that a relationship between a first composite vibration position determined based on a vibration level of each vibrator in a first vibrator group of the plurality of vibrators and a second composite vibration position determined based on a vibration level of each vibrator in a second vibrator group of the plurality of vibrators agrees with the identified directional component, and controls the delay of output vibration of each of the vibrators according to the directional component.

13. An information processing system comprising:

a plurality of vibrators, and an information processing device comprising a controller for controlling the plurality of vibrators, wherein the controller controls an amplitude and a delay of output vibration of each of the vibrators according to an angular region in which a target of a vibration source is positioned, identifies a directional component of an object constituting the vibration source in input content, determines which of a plurality of predetermined angle areas the directional component belongs to, selects a model corresponding to the determined angle area of the directional component from models preset individually for the angle areas, and controls an amplitude and a delay of output vibration of each of the vibrators, based on the selected model.

14. The information processing system according to claim 13, wherein the controller replays XR content, detects, from the XR content, a scene in which sound is generated from the target, extracts a vibration parameter corresponding to the scene, the vibration parameter controlling the vibrators, enhances a signal obtained by processing a signal of sound generated from the target using the vibration parameter, and controls the vibrators using a vibration signal obtained by processing amplitude and a delay of a signal enhanced by the enhancing.

15. The information processing system according to claim 14, wherein the information processing system further comprises an audio output device configured to generate sound in response to an audio signal output from the information processing device, and the controller extracts an audio parameter related to audio processing corresponding to the scene, and outputs, to the audio output device, the audio signal subjected to an enhancement process using the audio parameter.

16. The information processing system according to claim 13, wherein the information processing system further comprises an audio output device configured to generate sound in response to an audio signal output from the information processing device, and the controller controls the vibrators using a vibration signal obtained by processing amplitude and a delay of a signal enhanced by enhancing based on a signal of sound generated from the target.

* * * * *